United States Patent [19]
Kikuchi et al.

[11] Patent Number: 5,250,786
[45] Date of Patent: Oct. 5, 1993

[54] D-C ARC WELDING APPARATUS

[75] Inventors: Shinji Kikuchi; Toshihiko Tanuma; Toshimichi Suzuki, all of Gunma, Japan

[73] Assignee: Sawafuji Electric Co., Ltd., Tokyo, Japan

[21] Appl. No.: 766,416

[22] Filed: Sep. 25, 1991

[30] Foreign Application Priority Data

| Sep. 27, 1990 | [JP] | Japan | 2-258628 |
| Jul. 24, 1991 | [JP] | Japan | 3-58025[U] |
| Aug. 7, 1991 | [JP] | Japan | 3-61997[U] |
| Aug. 13, 1991 | [JP] | Japan | 3-202760 |

[51] Int. Cl.$^5$ ............................................. B23K 9/10
[52] U.S. Cl. .................................. 219/130.32; 219/133
[58] Field of Search ............... 219/130.1, 130.4, 133, 219/134

[56] References Cited
U.S. PATENT DOCUMENTS

| 3,502,897 | 3/1970 | McCollister et al. | 219/130.4 |
| 4,590,357 | 5/1986 | Winkler | 219/133 |
| 4,705,934 | 11/1987 | Winkler | 219/134 |
| 4,999,563 | 3/1991 | Suzuki | 219/133 |

FOREIGN PATENT DOCUMENTS

| 703291 | 2/1965 | Canada | 219/130.1 |
| 53-4812 | 2/1978 | Japan | 219/133 |

*Primary Examiner*—Clifford C. Shaw
*Attorney, Agent, or Firm*—McGlew & Tuttle

[57] ABSTRACT

A d-c arc welding apparatus including an engine-driven welder converting the a-c power generated by an engine-driven alternator into d-c power for use as the drive power of the welder, a battery-driven welder using a battery as the drive power of the welder, and a changeover switch for selecting between a high-power mode in which the above-mentioned welding d-c outputs are connected in parallel and fed to the welding apparatus, and a low-power mode in which either of the above-mentioned welding d-c outputs is supplied independently to the welding apparatus.

12 Claims, 18 Drawing Sheets

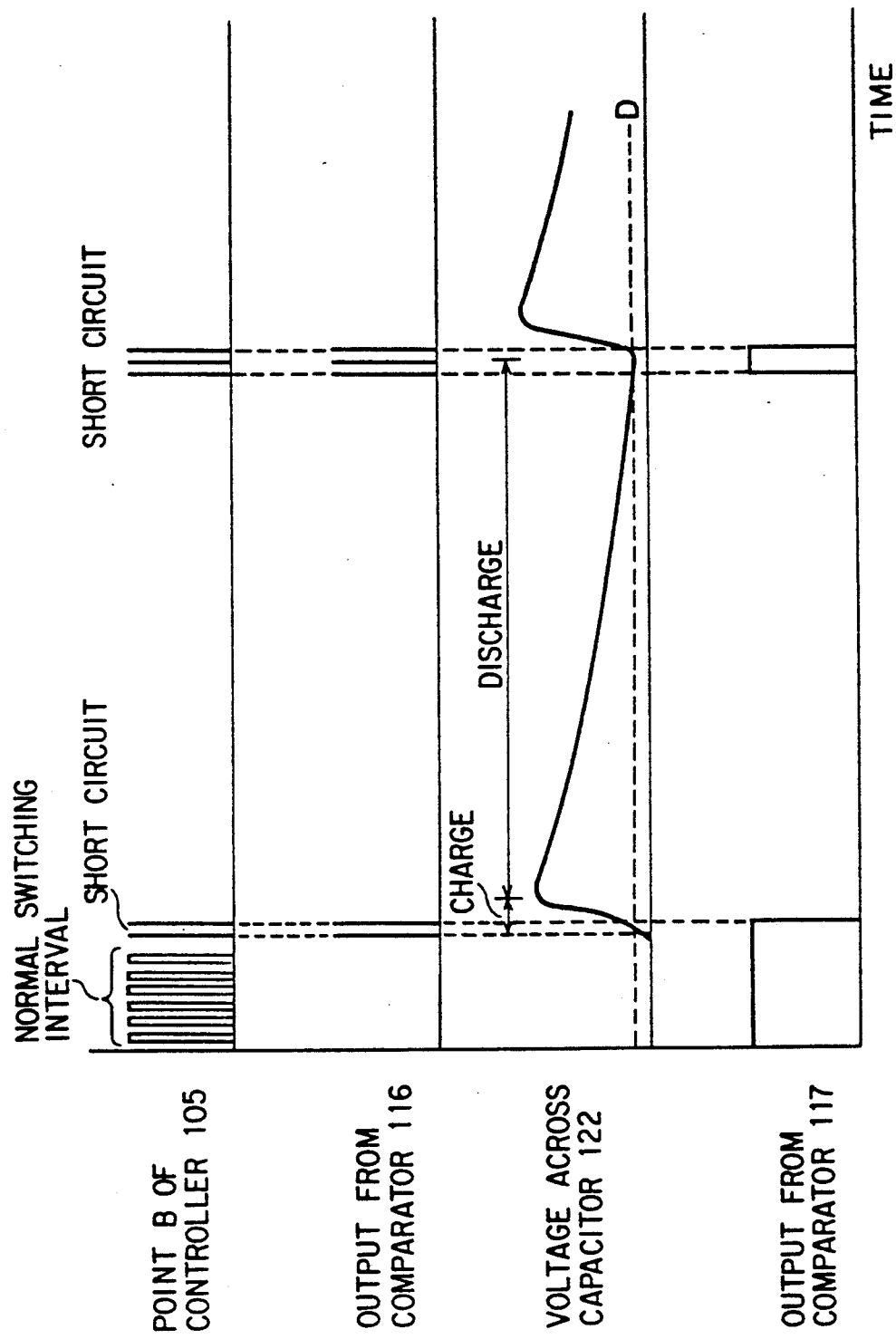

FIG. 13

D-C ARC WELDING APPARATUS

BACKGROUND OF THE INVENTION

1. Field of the Invention

This invention relates generally to a d-c arc welding apparatus, and more particularly to a d-c arc welding apparatus in which both an engine-driven welder and a battery-driven welder are provided and combined together.

2. Description of the Prior Art

In general, mobile engine-driven arc welders are used for welding operations at outdoor sites where no electric power is available. As such an engine-driven welder, an apparatus for converting the a-c output voltage of an alternator driven by an engine into d-c voltage via a rectifier for use as the drive power of the welder is publicly known. Such a welder commonly uses a gasoline engine of an output of 6-8 PS, with the welding output current being 140-170 A. For welders having a welding output current as high as 280 A, an engine having an output of 18-20 PS, such as a diesel engine is usually employed. Aside from the above-mentioned engine-driven welders, mobile battery-driven welders in which a plurality of batteries are connected in series to generate a welding output current of approximately 140 A are often used as d-c arc welders.

The mobile-type d-c arc welders mentioned above are useful for relatively small-current welding, as often found in construction sites and other work sites. With the progress of welding techniques and the increased size of structures being welded in recent years, demand for high-current welders of a welding output current of 280 A has been increasing to meet the increased need for high-current welding operations in construction sites. To have such a high welding output current, the conventional gasoline engine has to be replaced with a diesel engine, and the manufacturing process of the engines also has to be radically changed, making the manufacture of engines complicated or even impossible on the side of the manufacturers of gasoline engines. In addition, engine-driven welders involve offensive exhaust gas, noise and vibration caused by the engines, making it impossible to use in indoor sites and limited working space. In such work sites, battery-driven welders are more effective. Even in such applications, however, battery-driven welders cannot be operated for a length of time exceeding the capacity of the battery if no commercial power source is available, and the use of them is therefore limited to welding operations for a relatively short period. Furthermore, even when a high-output welder equipped with a diesel engine is installed in welding sites where high-current welding operations are expected, as noted earlier, high-current welding operations are not carried out at all times, but low-power welding operations are also frequently performed. In such cases, performing low-current welding with a high-power welder could lead not only to poor economy in terms of running costs, including the fuel cost of a diesel engine, but also to deteriorated working environment caused by noise and vibration.

FIG. 19 shows a circuit diagram of a conventional choppertype battery welder. Reference numeral 1 refers to a power source; 2 to a reactor; 3 to a swiching element, such as a transistor; 4 to a shunt resistor; 5 to a controller; 6 to a weld zone; 6-1 and 6-2 to welding output terminals; 7 to a commutating diode; and 8 to a photocoupler, respectively.

The reactor 2 is usually connected in series to the line to smooth current and prevent arc extinguishing.

When the transistor as the switching element 3 is turned on via the photocoupler 8 by the control of the controller 5, current flows in the direction shown by a solid-line arrow in the figure in a circuit consisting of the power source 1, the reactor 2, the shunt resistor 4, the transistor as the switching element 3, the earth and the power source 1.

When the transistor as the switching element 3 is turned off, the energy accumulated in the reactor 2 causes current to flow in the direction shown by a dotted-line arrow in the figure in a circuit consisting of the reactor 2, the shunt resistor 4, the weld zone 6, the commutating diode 7 and the reactor 2 to prevent arc extinguishing at the weld zone 6.

A welding output having a constant-current characteristic as ..iown in FIG. 21 is obtained by detecting a welding current flowing in the shunt resistor 4, and producing a PWM (pulse-width modulation) controlling signal in the controller 5 on the basis of the detected welding current so as to obtain the optimum current to control the transistor as the switching element 3 via the photocoupler 8.

With the conventional circuit configuration as shown in FIG. 19, in which a shunt resistor 4 for detecting current is connected in a loop of the reactor 2, the negative potential side of the shunt resistor 4 has to be isolated from the earth, making it impossible to use an earth line in the controller 5. As a result, the transistor as the switching element 3 has to be driven by an insulated circuit element, such as the photocoupler 8.

This necessitates an expensive floating charge power source for the controller 5 and the use of an insulated circuit element to drive the switching element 3, increasing the number of circuit components.

With the circuit configuration shown in FIG. 20, the power source 1 of the battery welder not only supplies power to the welding circuit, but also prevents the battery 11 from being charged, and overvoltage from being input to the power source.

A commercial power source 9 is fed to the primary side of a transformer 15 via a no-fuse breaker 13 and a relay 14, and the voltage generated in the secondary side of the transformer 15 is rectified by diodes 16 and 17 to charge the battery 11 and supply d-c power to the welding circuit.

The battery must be charged in a trickle-charge mode to stabilize the specific gravity of the battery solution even after the specified voltage is reached. Trickle charging is performed for a predetermined period using a timer by reducing the secondary-side output voltage by changing over the tap of the primary winding of the transformer 15.

Overvoltage is prevented from being input to the commercial power source 9 to cause damage to the battery 11, the transformer 15, and the diode 16, when 100-V power is connected inadvertently to a 200-V power source, as often experienced in Japan, by providing a no-fuse breaker 13, which is also used as a main switch, in the primary side of the transformer 15.

In the conventional battery charging practice where trickle charging is performed by changing over the tap of the primary winding of the transformer 15 using the relay 14, reliability could be substantially lowered by the contacts of the relay 14, and provision of an intermediate tap in the primary side of the transformer 15 could lead to an increase in the equipment cost.

The above-mentioned overvoltage protection method using the no-fuse breaker 13 which also serves as a main switch requires a certain time until the no-fuse breaker 13 is actuated, and could cause damage to the transformer 15, the diodes 16 and 17, etc. when the user is not aware of overvoltage even after the equipment is put into operation and repeatedly turning on the no-fuse breaker 13.

In a battery-driven welder controlled by electronic circuits, a transistor as the switching element 3 is used for controlling welding current. The switching element 3 for controlling large current is mounted on a heatsink to dissipate heat. In addition, a fan is normally used to increase cooling efficiency.

This fan is driven by a battery 11 which is a power source for the welder.

The control of the rotation/stop of the conventional welder fan is interlocked with the turning on and off of the main switch.

With the construction in which the control of the rotation/stop of the fan is interlocked with the main switch, as found in the conventional type, the fan is kept operating even when welding operation is not carried out, causing much loss of energy. If the main switch is inadvertently left turned on, the battery could exhaust.

SUMMARY OF THE INVENTION

It is an object of this invention to provide a d-c arc welding apparatus for performing both high-current and low-current welding operations efficiently.

It is another object of this invention to provide a d-c arc welding apparatus in which a battery can be charged by the a-c voltage supplied by an external commercial a-c power source, or generated by an engine-driven welder.

It is still another object of this invention to provide a battery charger that can charge a battery in a trickle charge mode and is protected against overvoltage input, when overvoltage input is applied to the battery charger, by cutting off the overvoltage input.

It is a further object of this invention to provide a battery driven welder having a new type of welding current detecting method in which a shunt resistor is connected between a switching element and the earth.

It is still a further object of this invention to provide a battery-driven welder having a protective circuit for protecting switching element.

It is still a further object of this invention to provide a battery-driven welder that can operate a fan in a rational fashion.

In embodiments disclosed in this Specification, the d-c arc welding apparatus comprises an engine-driven welder in which the a-c voltage generated in an engine-driven alternator is converted into d-c for use as the drive power of the welding apparatus, a battery-driven welder using a battery as the drive power, and a changeover switch for selecting between a high-power mode where the welding d-c outputs of both welders are supplied to the welding apparatus by connecting both in parallel, and a low-power mode where the d-c output of either of the welders is supplied to the welding apparatus.

BRIEF DESCRIPTION OF THE DRAWINGS

FIG. 10 is a time chart of the operation of the short-circuit current control circuit.

FIG. 13 is a diagram illustrating the construction of an example of the charge control circuit.

DETAILED DESCRIPTION OF PREFERRED EMBODIMENTS

First, this invention will be described briefly, referring to FIG. 1.

Figure 1:
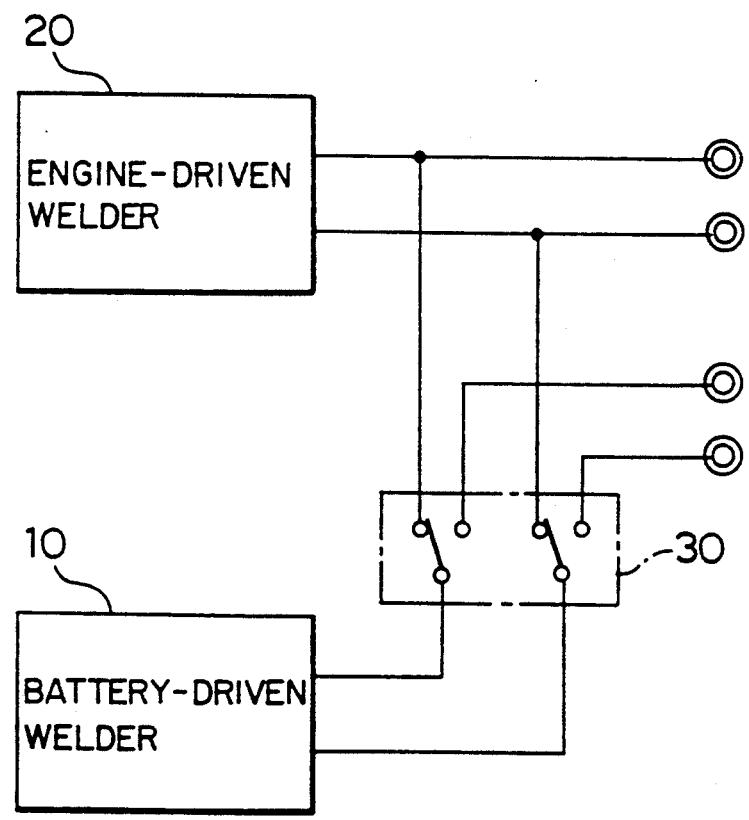
FIG. 1 is a block diagram of the basic construction of this invention.

In FIG. 1, reference numeral 10 refers to a battery-driven welder that is an arc welder using a battery as the drive power; reference numeral 20 refers to an engine-driven welder that is an arc welder in which the a-c voltage generated by an alternator driven by an engine is converted into d-c to obtain desired welding output characteristics.

The battery-driven welder 10 and the engine-driven welder 20 are separate d-c arc welders, which are changed over by a changeover switch 30 to select between high-power and low-power modes.

The high-power mode is obtained when the contacts of the changeover switch 30 are thrown to the state shown in FIG. 1, in which the battery-driven welder 10 and the engine-driven welder 20 are connected in parallel to enable high-current welding operation.

When the contacts of the changeover switch 30 are thrown to a state opposite to that shown in FIG. 1, the low-power mode is obtained, in which the battery-driven welder 10 and the engine-driven welder 20 can be operated individually. In this mode, welding output is lower than that obtained in the high-powder mode, but two separate welding operations can be performed simultaneously.

Figure 2:
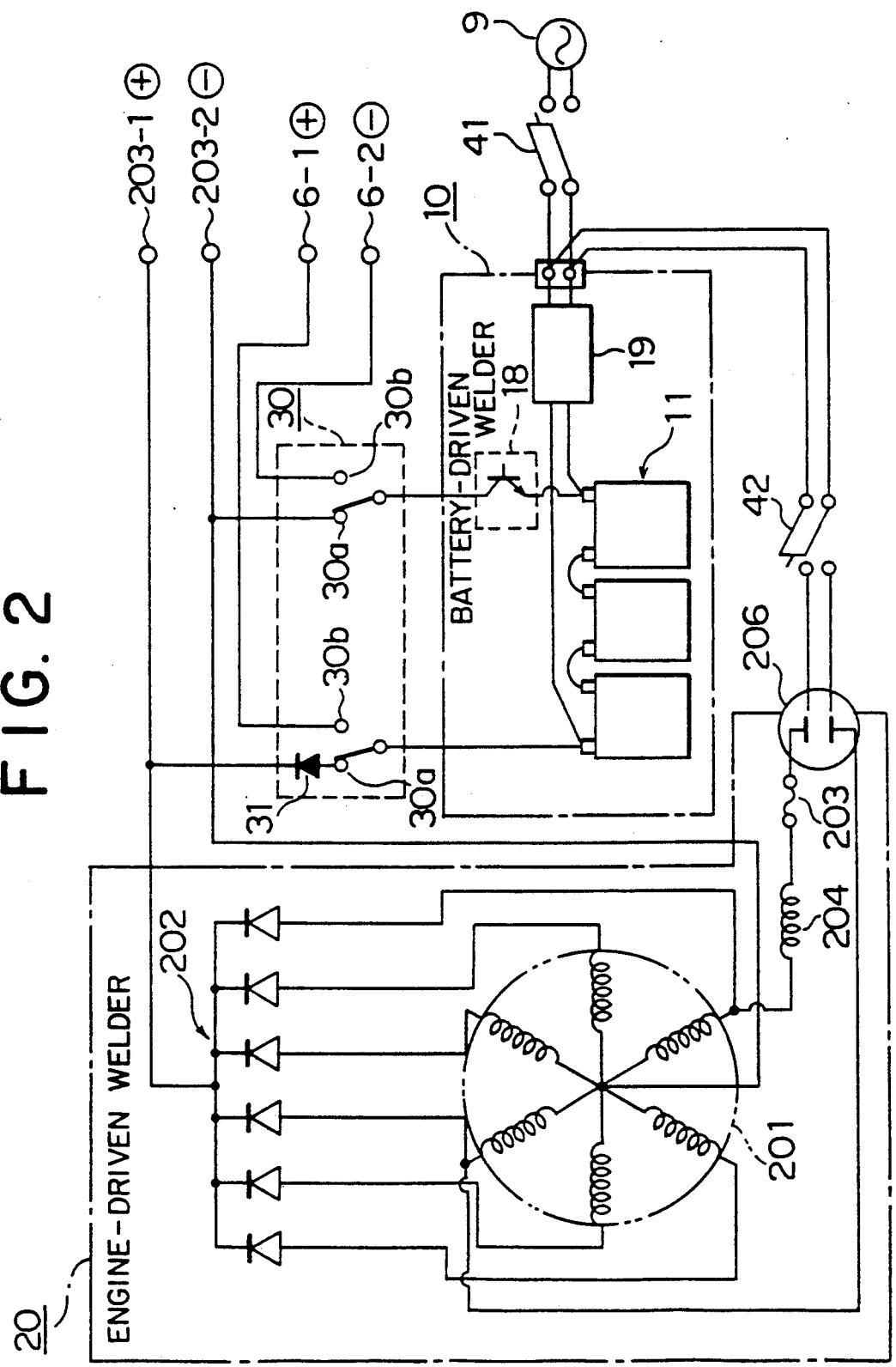
FIG. 2 is a diagram illustrating the construction of an embodiment of this invention.

FIG. 2 shows the construction of an embodiment of this invention. In FIG. 2, numeral 20 refers to an engine-driven welder, and 10 to a battery-driven welder; both being provided individually. The construction of the engine-driven welder 20 will be described in the following. Numeral 201 indicates an alternator driven by a gasoline engine (not shown) to generate 6-phase half-wave a-c voltage. Numeral 202 indicates a half-wave rectifier, which converts the output of the alternator 201 into d-c to feed to output terminals 203-1 and 203-2. Numeral 204 indicates a single-phase a-c winding wound in the alternator 201 so that 100 volts a-c can be output via a circuit breaker 203 and an output terminal 206.

Next, the battery-driven welder 10 is such that a plurality of batteries 11 are connected in series, and a chopper control device 18 for controlling the output voltage of the battery 11 is connected to the negative [−] output side, while d-c voltage can be output to the positive [+] output side from output terminals 6-1 and 6-2 via a changeover switch 30. The chopper control device 18 is used for adjusting the above-mentioned d-c voltage with on-off control.

The welding d-c outputs of the engine-driven welder 20 and the battery-driven welder 10, which are connected in such a manner as described above, are connected in parallel via a diode 31 and the changeover switch 30.

Numeral 19 indicates a battery charger which is connected to a commercial a-c power source (100 volts a-c, as is used in Japan, for example) 9 via a switch 41 so that the battery 11 can be charged with d-c power. The battery charger 19 can be connected to the output terminal 206 of the alternator 201 via a switch 42. It should be noted, however, that the switches 41 and 42 cannot be turned on at the same time.

With the above construction, when the changeover switch 30 is changed to the side of the contact 30a (the state shown in FIG. 2), both the welding d-c output of the engine-driven welder 20 and the welding d-c output of the battery-driven welder 10 can be output together to the output terminals 203-1 and 203-2. In this case, the welding d-c output of the engine-driven welder 20 can be prevented from being output to the battery-driven welder 10 because the diode 31 is provided on the output side of the battery-driven welder 10. When the changeover switch 30 is changed to the side of the contact 30b, on the other hand, the welding d-c output of the engine-driven welder 20 and the welding d-c output of the battery-driven welder 10 can be output independently to the output terminals 203-1 and 203-2, and 6-1 and 6-2.

Assume that the welding d-c output of the engine-driven welder 20 and the battery-driven welder 10 are 140 amperes each, for example, a welding d-c output of 280 amperes can be obtained from the output terminals 203-1 and 203-2 by changing the changeover switch 30 to the side of the contact 30a. By changing the changeover switch 30 to the side of the contact 30b, on the other hand, two welding d-c outputs each of 140 amperes can be obtained from the output terminals 203-1 and 203-2, and 6-1 and 6-2. With this arrangement, therefore, 140-A welding operations can be performed simultaneously at two different locations, and when 140-A welding operation is to be performed at one location, either of the engine-driven welder 20 or the battery-driven welder 30 can be operated by changing the changeover switch 30 to the contact 30b.

To charge the battery 11 constituting the battery-driven welder 10, d-c power can be fed to the battery 11 from the commercial a-c power source 9 via the charging device 19 by closing the switch 41. Since the alternator 201 constituting the engine-driven welder 20 has a single-phase a-c winding 204, the battery 11 can be charged by the alternator of the engine-driven welder 20 via the charging device 19 by closing the switch 42. Thus, the battery 11 can be charged even at an outdoor working site where no commercial a-c power is available. Note that the switches 41 and 42 cannot be turned on simultaneously.

Figure 3A:
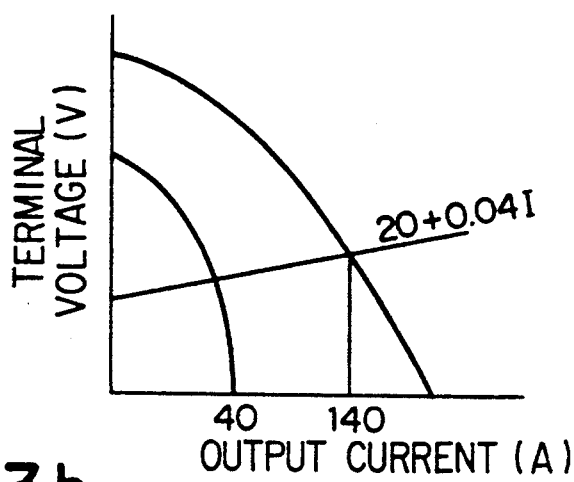
FIGS. 3 (a) through (c) are characteristic diagrams illustrating the output of an embodiment of this invention.
Figure 3B:
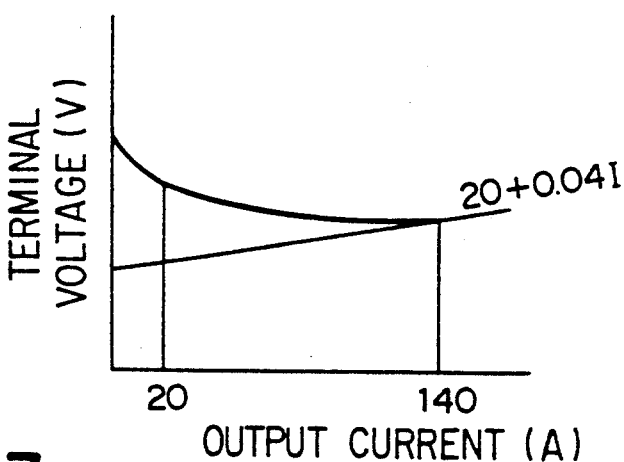
Figure 3C:
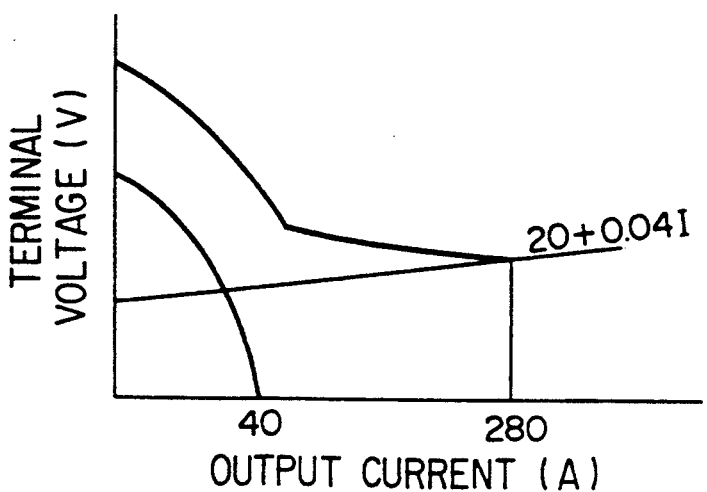

FIGS. 3(a) through (c) are diagrams illustrating welding characteristics, that is, the relationship between output current and terminal voltage in an embodiment of this invention. FIGS. 3(a) and (b) show the state where either of the engine-driven welder 20 or the battery-driven welder 10 as shown in FIG. 2 is operated singly, and FIG. 3(c) shows the state where the welding d-c outputs of the welders 10 and 20 were superposed. As is evident from FIG. 3(c), the parallel connection of the welders 10 and 20 yields the sum of the identical d-c outputs of both, i.e., 140+140=280(A) without applying loads unevenly on any one of them.

Although description has been made in this embodiment as to the state where the alternator 201 of the engine-driven welder 20 outputs a 6-phase half-wave a-c voltage, this invention may generally be constructed so that an m-phase (m bing a positive integer) a-c voltage can be output. In such a case, the larger the integer m, the more desirable because ripples in the output from the output terminals 203-1 and 203-2 can be reduced. The foregoing description is concerned with an example where a half-wave rectifier 202 is used as the rectifier for converting the output voltage of the alternator 201 into d-c voltage. This invention, however, is not limited to this construction, and a full-wave rectifier, thyristor or any other rectifier may be used.

Consequently, even when a low-power engine-driven welder 20 having a welding d-c output of 140 A is used, a welding apparatus having a two-fold output can be constructed by connecting the engine-driven welder 20 is parallel with a similar low-power battery-driven welder 10.

Thus, manufacturing cost can be almost halved compared with a diesel-engine welder with the same output.

Even when welding operation is performed indoors or in a limited space, environmental pollution caused by noise, vibration or exhaust gas can be eliminated by operating the battery-driven welder 10 only.

In addition, low-power welding operations can be performed simultaneously at two different locations.

Since the battery 11 can be charged with the alternator 201 by providing a single-phase a-c winding 204, the battery-driven welder 10 can be operated for long hours in the absence of the commercial a-c power source 9.

With this invention, space and weight can be substantially reduced compared with a diesel-engine driven welder of the same output.

The weight of the welding apparatus can be reduced because no battery is needed for starting the engine.

Figure 4:
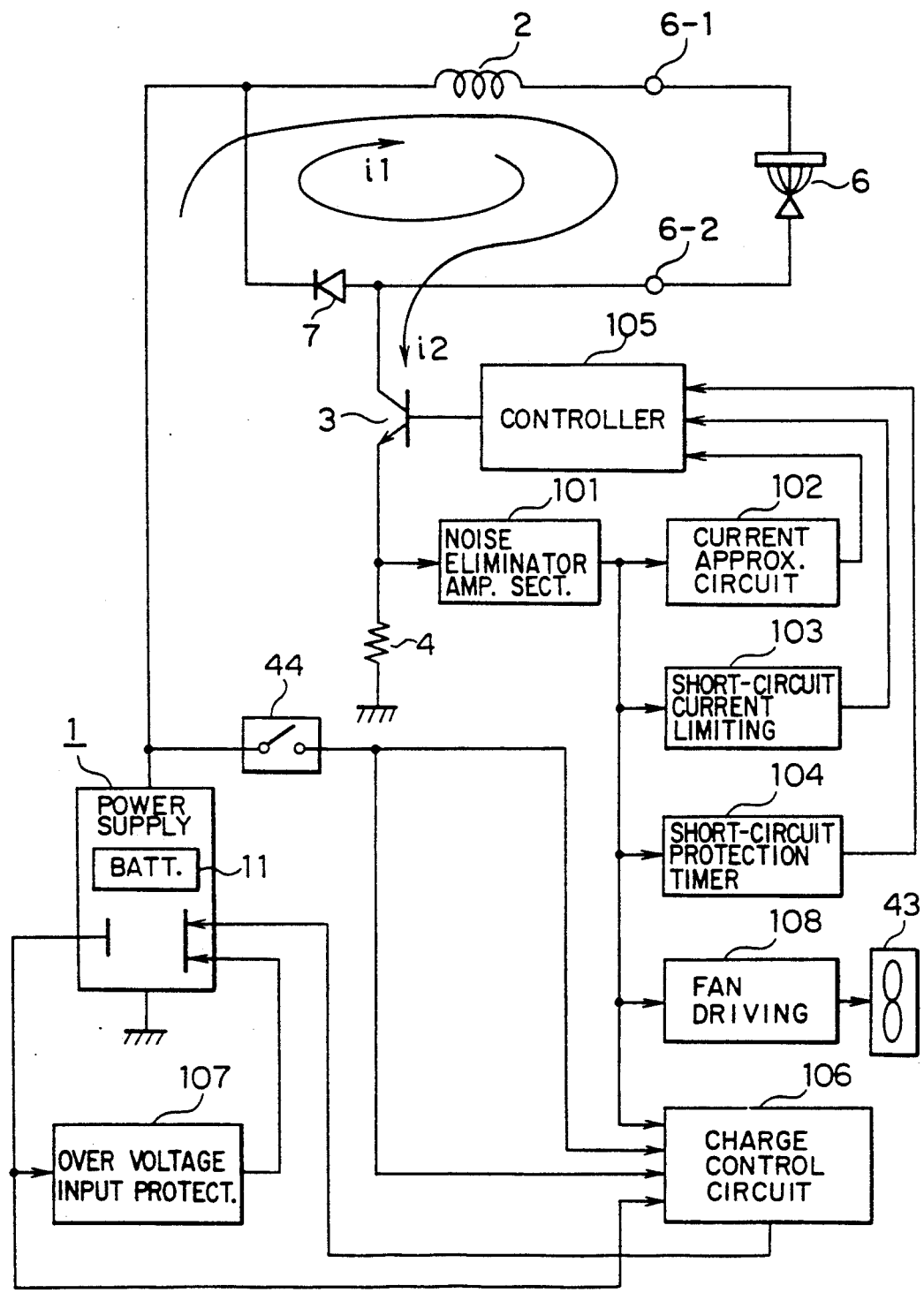
FIG. 4 is a block diagram illustrating the construction of an example of the battery-driven welder of this invention.
Figure 19:
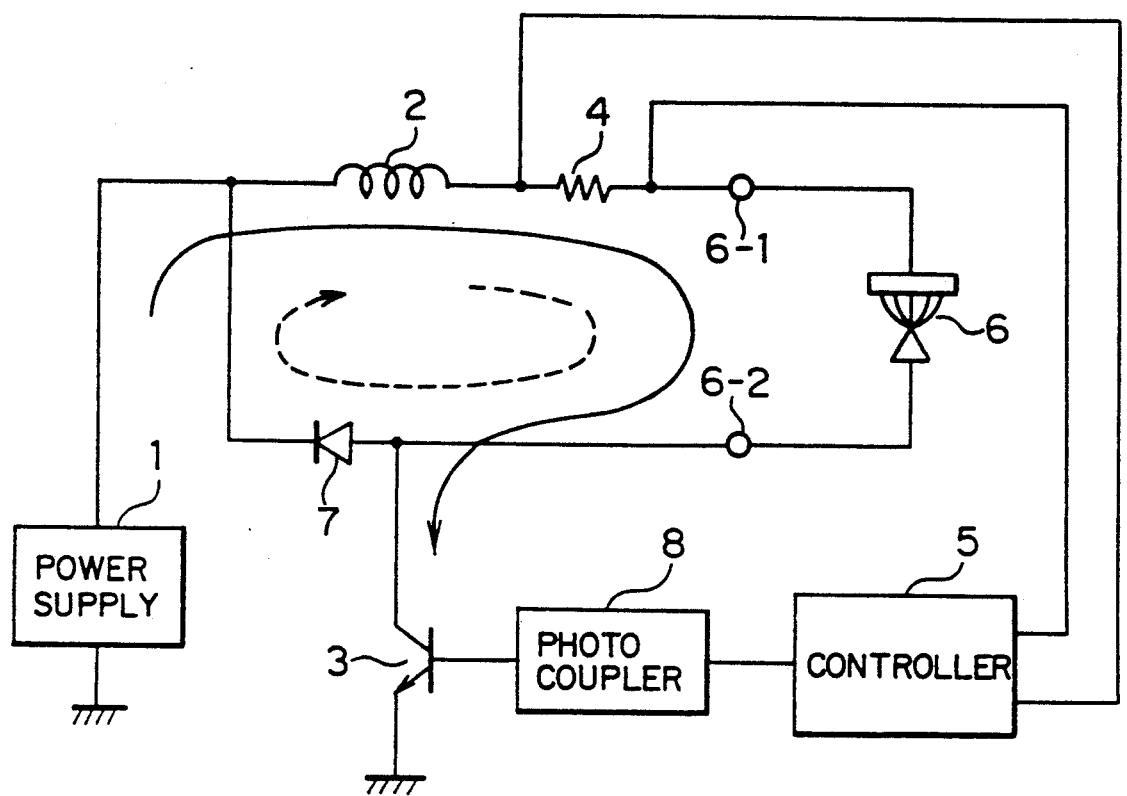
FIG. 19 is a diagram illustrating the circuit configuration of the conventional chopper-type battery welder.

FIG. 4 is a diagram illustrating the construction of an embodiment of the battery-driven welder. Numerals 1 through 4, 6, 6-1, 6-2 and 7 correspond to like numerals in FIG. 19. Numeral 101 refers to a noise eliminator- /amplifier section; 102 to a current approximation circuit; 103 to a shortcircuit current limiting circuit; 104 to a shortcircuit protection timer circuit; 105 to a controller; 106 to a charge control circuit; 107 to an overvoltage input preventing circuit; 108 to a fan driving circuit; 43 to a fan; and 44 to a charging switch, respectively.

In FIG. 4, a shunt resistor 4 is connected between a switching element 3 (in the following description, a transistor is used as an example) and the earth.

Consequently, when the transistor 3 is turned on by the control of the controller 105, current i2 flows in the direction shown by an arrow in a circuit consisting of the power source 1, the reactor 2, the weld zone 6, the transistor 3, the shunt resistor 4, the earth and the power source 1. The current i2 is detected by the shunt resistor 4, and input to the current approximation circuit 102 via the noise eliminator/amplifier section 101.

As the transistor 3 is turned off, the energy accumulated in the reactor 2 causes current i1 to flow in the direction shown by an arrow in a circuit consisting of the reactor 2, the weld zone 6, the commutating diode 7 and the reactor 2 to prevent the arc in the weld zone 6 from being extinguished, as in the conventional welding apparatus.

The shortcircuit current limiting circuit 103 is used to block the ON operation of the transistor 3 via the controller 105 when the peak value of the current i2 flowing in the shunt resistor 4 becomes larger than a predetermined value.

The shortcircuit protection timer circuit 104 is used to stop the operation of the transistor 3 via the controller 105 when a peak current larger than a predetermined current value flows in the shunt resistor 4 and is kept flowing for more than a predetermined time.

With these shortcircuit current limiting circuit 103 and shortcircuit protection timer circuit 104, electrical circuits, particularly the transistor 3 as a switching element, are protected.

Figure 5:
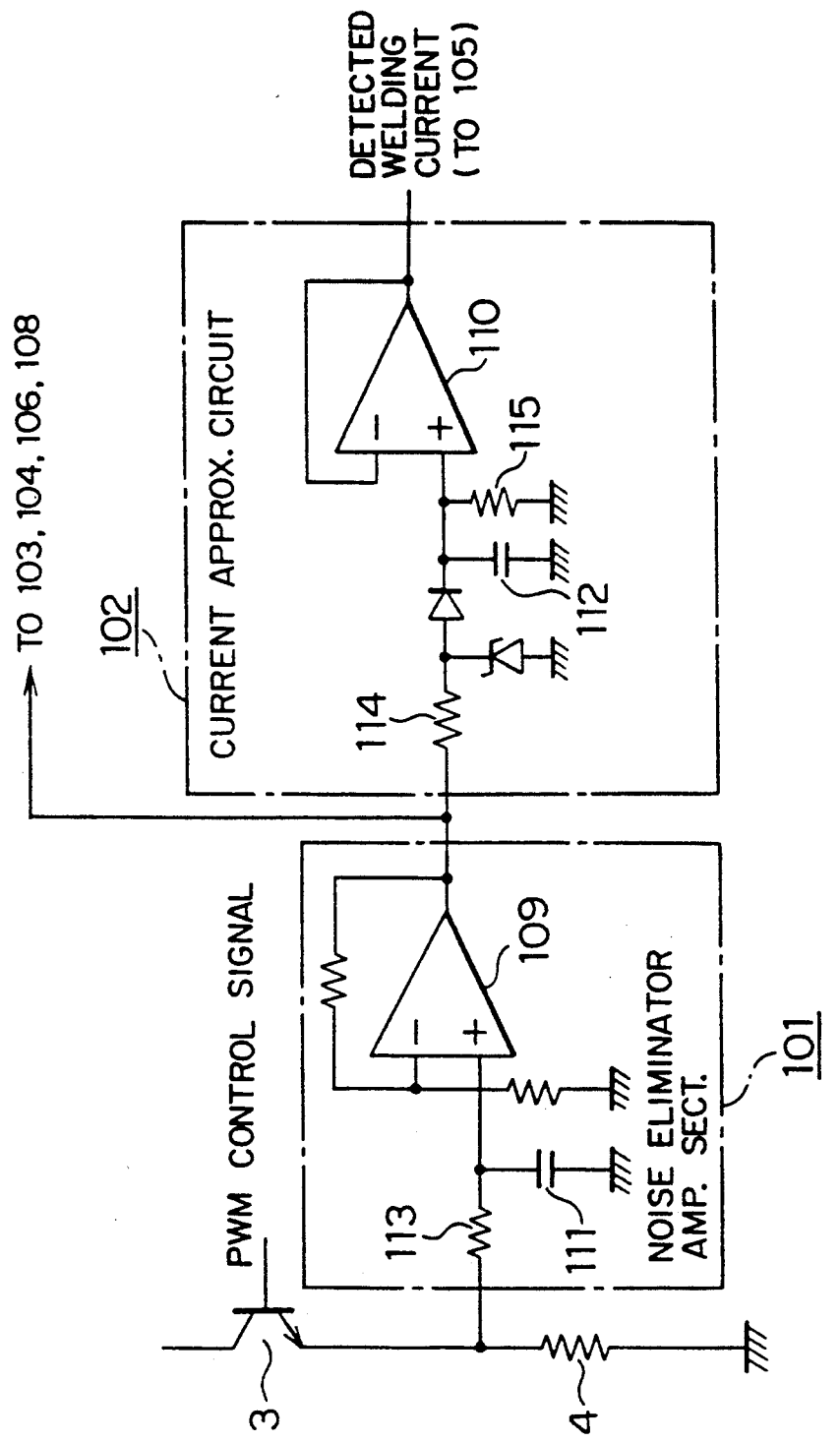
FIG. 5 is a diagram illustrating the construction of an example of the noise eliminator/amplifier section and the current approximation circuit.
Figure 6:
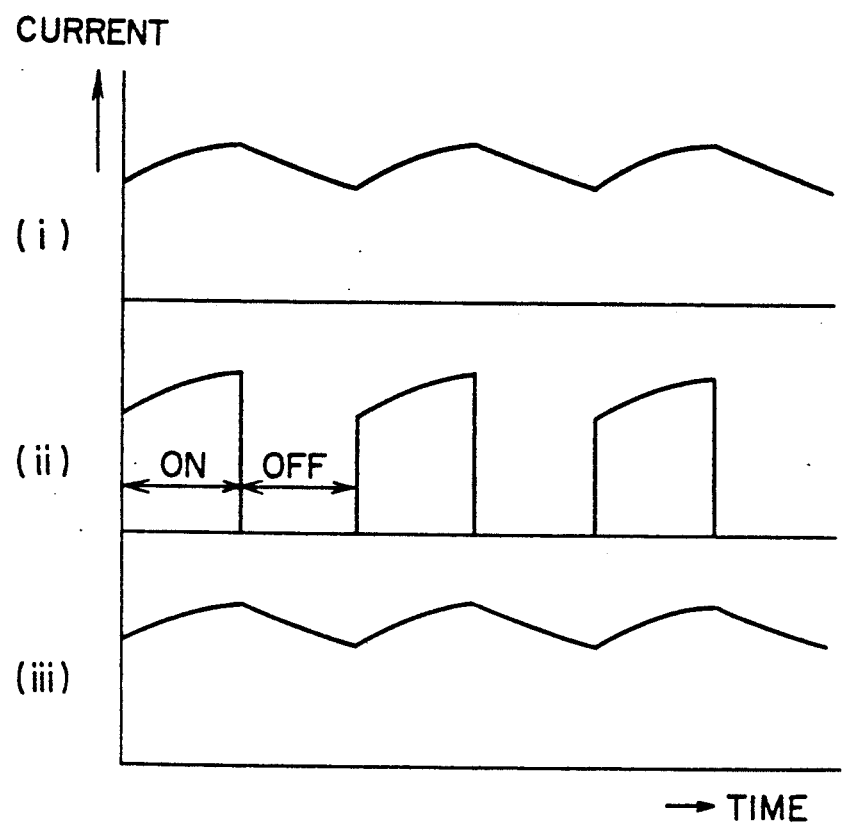
FIG. 6 is a diagram of assistance in explaining welding current waveforms.

FIG. 5 shows the construction of the noise eliminator/amplifier section and the current approximation circuit, and FIG. 6 is a diagram of assistance in explaining the waveforms of welding currents.

In FIG. 5, reference numerals 3, 4, 101 and 102 correspond with like numerals in FIG. 4. Numeral 109 refers to an amplifier; 110 to a buffer amplifier; 111 and 112 to capacitors; and 113 through 115 to resistors, respectively.

When the transistor 3 is turned on, current i2 flows in the shunt resistor 4, and when the transistor 3 is turned off, current does not flow in the shunt resistor 4. Thus, current waveforms as shown in FIG. 6 (ii) are generated in the shunt resistor 4 in accordance with the ON and OFF of the transistor 3. The detected voltages corresponding to the current waveforms generated in the shunt resistor 4 is subjected to an input filter consisting of the resistor 113 and the capacitor 111 to remove high-frequency noise, amplified appropriately by the amplifier 109, and then input to the current approximation circuit 102.

In the current approximation circuit 102, charging is initiated with a characteristic determined by a time constant R1·C1 of the resistor having a resistance value of R1 and the capacitor having a capacitance of C1 when the transistor 3 is turned on, and discharging is initiated with a characteristic determined by a time constant R2·C1 of the resistor 115 having a resistance value of R2 and the capacitor 112 having a capacitance of C1 when the transistor 3 is turned off, and this charge/discharge cycle is repeated.

By selecting appropriately the resistance values of the resistors 114 and 115, and the capacitance C1 of the capacitor 112 involving this charge/discharge cycle, an output (a waveform shown in FIG. 6 (iii)) having a waveform that is the same as or approximate to the welding current waveform (a waveform shown in FIG. 6b (i)) flowing in a loop of the reactor 2 shown in FIG. 4 can be obtined form the buffer amplifier 110. The time constants R1·C1 and R2·C1 for the charge/discharge cycle can be obtained from theoretical values or experiment results.

Figure 7:
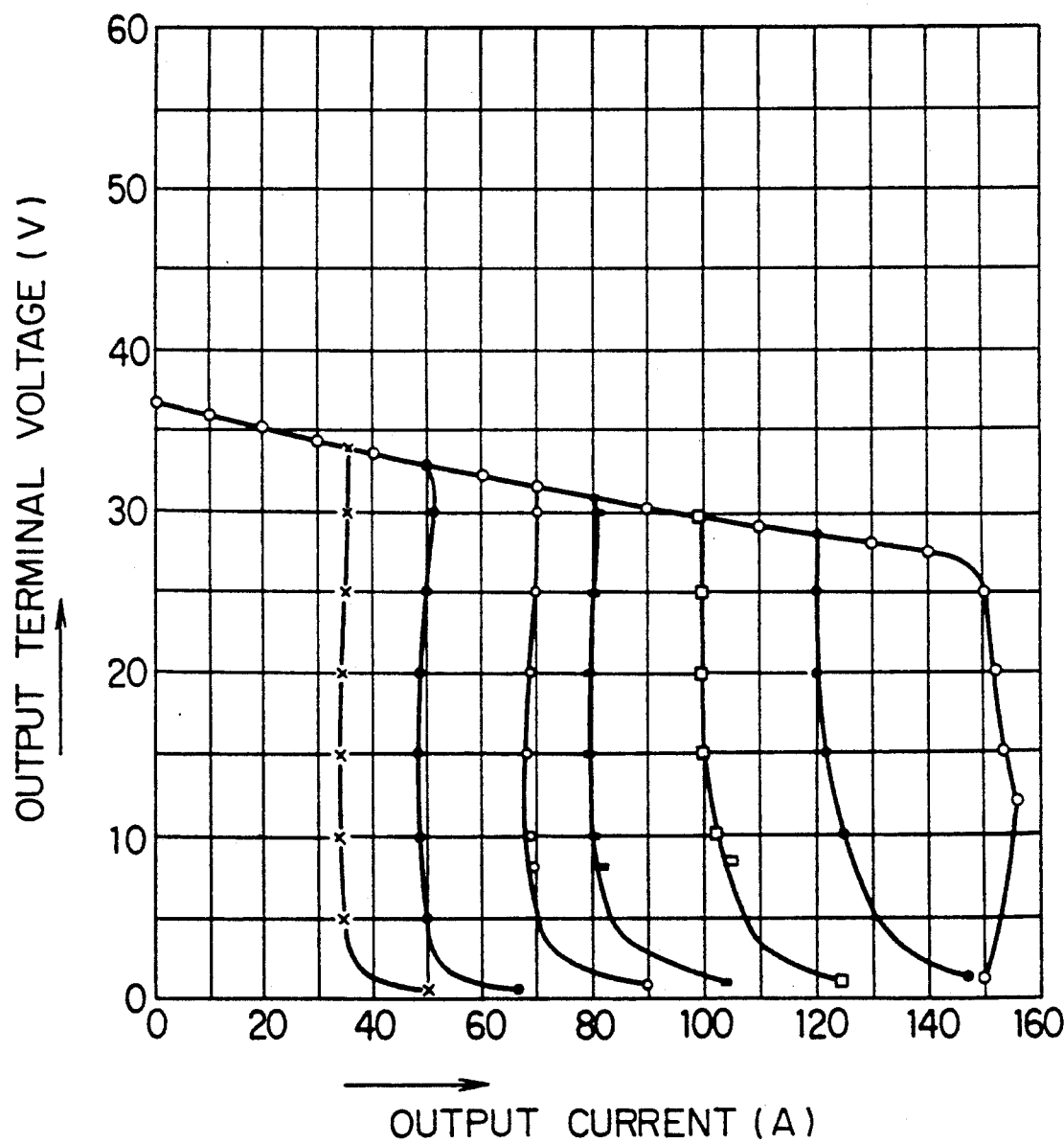
FIG. 7 is a characteristic diagram illustrating the welding output of a battery-driven welder according to this invention.

In this way, the detected voltage corresponding to the welding current obtained from the current approximation circuit 102 is output to the controller 105, which in turn controls the transistor 3 so that the optimum current is obtained through PWM control. That is, the control performance equivalent to that obtained when the shunt resistor 4 is connected in the conventional reactor loop shown in FIG. 19 can be obtained, as shown in FIG. 7.

As is apparent from the foregoing description, the need for isolating not only the current approximation circuit 102 and the controller 105 but also the shortcircuit current limiting circuit 103 and the shortcircuit protection timer circuit 104, both of which will be described later, from the earth can be eliminated.

Figure 8:
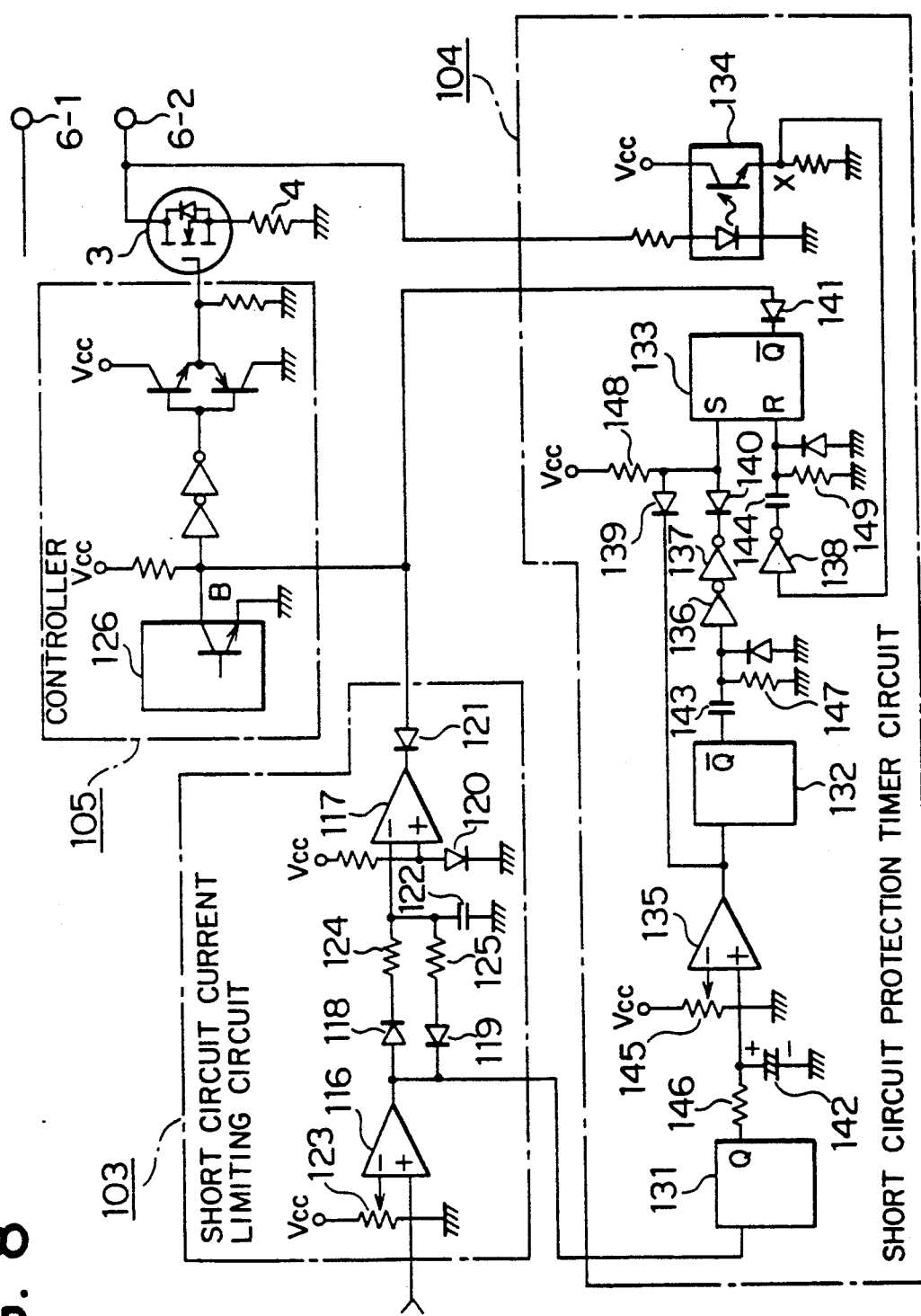
FIG. 8 is a diagram illustrating the construction of an example of the protective circuit.

FIG. 8 shows the construction of an embodiment of a protection circuit. In the figure, reference numerals 3, 4, 6-1, 6-2, 103, 104 and 105 correspond to like numerals shown in FIG. 4. Numerals 116 and 117 in the shortcircuit current limiting circuit 103 refer to comparators; 118 through 121 to diodes; 122 to a capacitor; 123 to a variable resistor; and 124 and 125 to resistors, respectively.

The output voltage of the amplifier 109 in FIG. 5, that is, the current flowing in the shunt resistor 4 is input to the nonreversible input terminal of the comparator 116, while the reference voltage of the shortcircuit protection start current set by the variable resistor 123 is input to the reversible input terminal of the comparator 116. As the output of the comparator 116 is changed from the L (low) level to the H (high) level, the capacitor 122 is charged via the diode 118 and the resistor 124. As the output of the comparator 116 is changed from the H level to the L level, the voltage charged in the capacitor 122 is discharged via the resistor 125 and the diode 119. As will be described later, the resistance value R4 of the discharging resistor 125 is very larger than the resistance value R3 of the charging resistor 124.

The comparator 117 compares the voltage in the capacitor 122 with the forward drop voltage of the diode 120 as the reference voltage. When the output of the comparator 117 is at the L level, point B in the controller 105 is lowered to the L level via the diode 121, and the operation of the transistor (power MOSFET) 3 is blocked regardless of the PWM control signal output by the IC 126 for PWM control.

Figure 9:
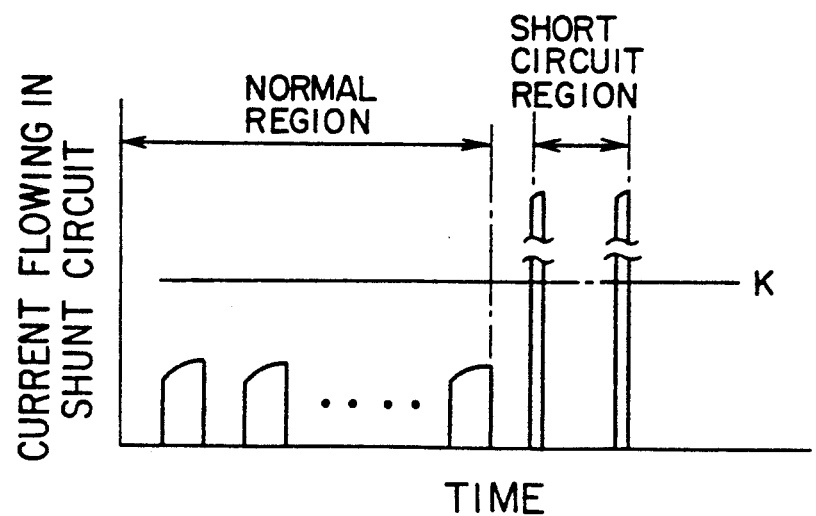
FIG. 9 is a diagram of assistance in explaining the waveforms of a current flowing in the shunt resistor.

During the normal welding operation, the current detected by the shunt resistor 4 and input to the comparator 116 is smaller than the level K of the shortcircuit protection starting current set by the variable resistor 123, as shown by the normal region in FIG. 9, and the output of the comparator 116 is at the L level. Consequently, the output of the next-stage comparator 117 is at the H level, causing the transistor 3 to perform ON/OFF operation in accordance with the PWM control signal of the controller 105.

When a shortcircuit occurs during the arc welding of the weld zone 6, the current detected by the shunt resistor 4 and input to the comparator 116 becomes a peak current larger than the level K of the shortcircuit protection starting current, as shown in the shortcircuit region in FIG. 9, because the load resistance becomes close to zero, and a pulse is output by the comparator 116, as shown in FIG. 10. The pulse output by the comparator 116 causes the capacitor 122 to be quickly charged via the resistor 124.

As the charged voltage in the capacitor 122 exceeds the reference voltage D of the comparator 117. The comparator 117 outputs an L-level signal to block the operation of the transistor 3, as described above. As the operation of the transistor 3 is blocked, the inputting of the current detected by the shunt resistor 4 to the comparator 116 disappears, and as a result, the voltage charged in the capacitor 122 is discharged via the resistor 125. When the discharged voltage by the capacitor 122 becomes lower than the reference voltage D of the comparator 117, the comparator 117 outputs an H-level signal, bringing the transistor 3 into an operable state.

As the shortcircuit current detected by the shunt resistor 4 is input again to the comparator 116, a pulse is output by the comparator 116 to cause the capacitor to be charged quickly. Then, an L-level signal is output from the comparator 117 to block again the operation of the transistor 3.

These operations are repeated in the subsequent process.

In the PWM-based feedback control carried out by the controller 105, if the actual welding current is larger than the predetermined welding current, the output of the current approximation circuit 102 increases, while the duty of the PWM control signal output by the PWM control IC 126 decreases. Conversely, if the actual welding current is smaller, the output of the current approximation circuit 102 decreases, and the duty of the PWM control signal output by the PWM control IC 126 increases. In this way, control is effected so that welding current can be kept at a constant level.

During shortcircuited arc welding, the load current becomes close to zero, causing welding current to be sharply increased. The duty of the PWM control signal is reduced to suppress the welding current, causing the shortcircuit current to be concentrated within the reduced duty. Thus, the current flowing in the shunt resistor 4 is as shown in FIG. 9.

If welding current is completely turned off during shortcircuiting, however, the arc cannot be ignited, making it difficult to continue welding. The switching element is therefore prevented from being damaged due to a sharp temperature rise in the transistor 3 by effecting control to detect and keep the shortcircuit current to a current value within the maximum rating, as described above, and forcibly changing the switching frequency of the transistor 3 with the time constant (the resistance R3 of the resistor 124< <the resistance R4 of the resistor 125) or the resistor 124 and the capacitor 122, and the resistor 125 and the capacitor 122.

Numerals 131 and 132 in the shortcircuit protection timer circuit 104 shown in FIG. 8 refer to one-shot multivibrators; 133 to a flip-flop circuit; 139 through 141 to diodes; 142 through 144 to capacitors; 145 to a variable resistor; and 146 through 149 to resistors, respectively.

The shortcircuit protection timer circuit 104 is a circuit to cut off a shortcircuit current when the shortcircuit current lasts for a period longer than a predetermined time. The reference time for cutting off shortcircuit current is produced by the one-shot multivibrator 132.

Figure 11:
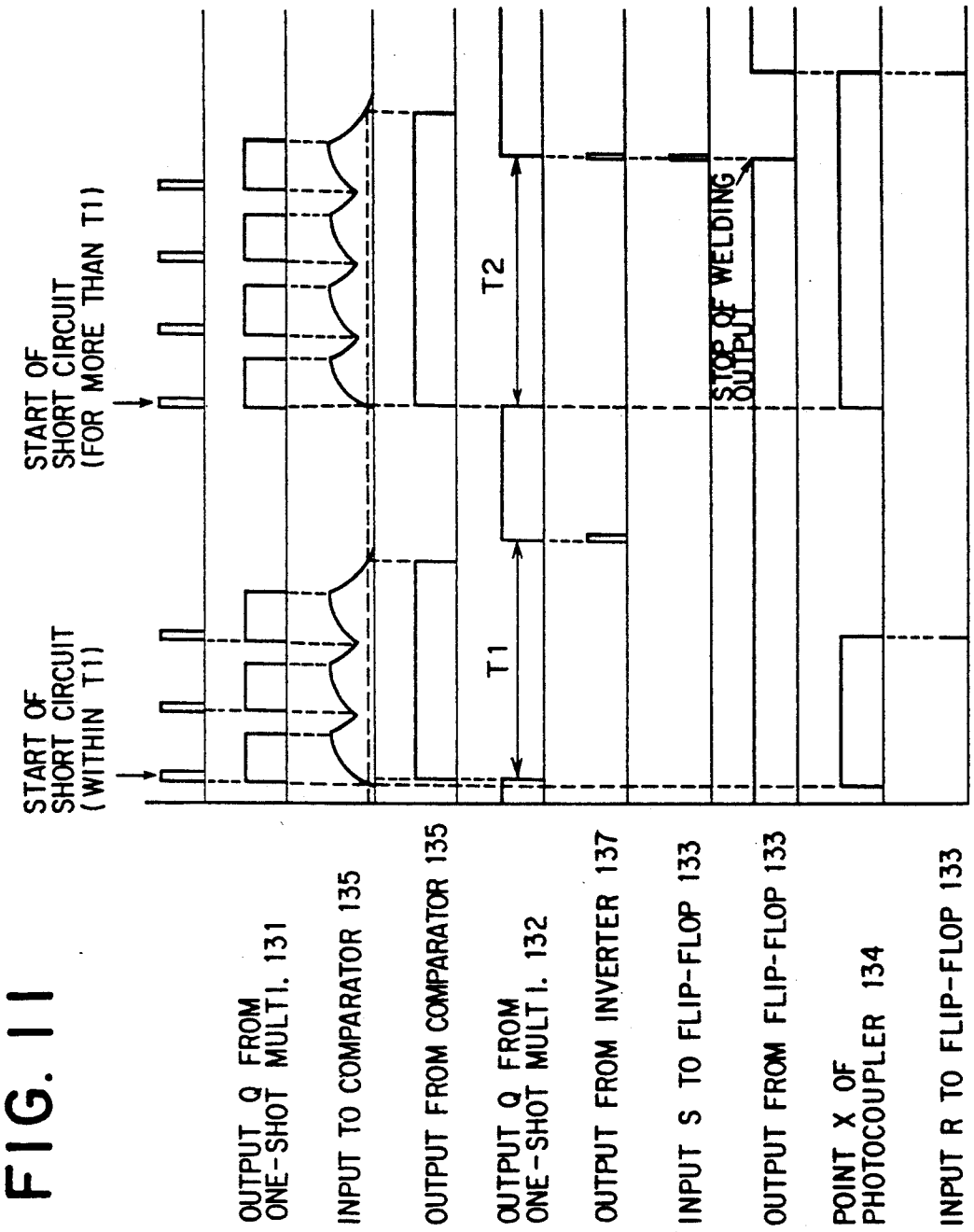
FIG. 11 is a time chart of the operation of the short-circuit protection timer circuit.

In the following, description will be made on both the state where shortcircuit current lasts for a period shorter than a predetermined time T1, and the state where shortcircuit lasts for a period longer than T1, referring to the time chart shown in FIG. 11.

The output of the comparator 116 in the shortcircuit current limiting circuit 103 is used as the input signal to the shortcircuit protection timer circuit 104.

As shortcircuiting begins, the one-shot multivibrator 131 is triggered every time the pulse output by the comparator 116 rises, and as a result, a pulse having a predetermined width is output from the output terminal Q of the one-shot multivibrator 131. The pulse having a predetermined width output by the one-shot multivibrator 131 is smoothed by the resistor 146 and the capacitor 142, compared with the reference voltage of the comparator 135, and an H-level signal is produced by the comparator 135. The one-shot multivibrator 132 is triggered at the leading edge of the H-level signal produced by the comparator 135, starting the monitoring of the duration of the shortcircuit current.

After the lapse of a predetermined time T1, the leading edge to the H-level signal is output from the output terminal Q of the one-shot multivibrator 132. The leading edge is differentiated by a differentiating circuit consisting of the capacitor 143 and the resistor 147, and a pulse for setting the flip-flop circuit 133 is produced in the next inverters 136 and 137.

The diodes 139 and 140 form an AND circuit, together with the resistor 148. When the aforementioned pulse is produced by the inverter 137, the setting of the flip-flop circuit 133 is determined by whether or not the output of the comparator 135 is maintained at the H level.

When the output of the comparator 135 is not maintaine at the H level, that is, when the shortcircuit state disappears within a predetermined time T1, the setting of the flip-flop circuit 133 is not performed, and thus thermal damage to the transistor 3 due to the sustained shortcircuit current can be avoided.

When the output of the comparator 135 is maintained at the H level, that is, when the shortcircuit state lasts for a period longer than a predetermined time T1, the aforementioned pulse produced by the inverter 137 sets the flip-flop circuit 133 via the diode 140 to change the output terminal Q thereof to the L level. Along with this, the PWM control signal output by the PWM control IC 126 in the controller 105 is diverted to the flip-flop circuit 133 via the diode 141, blocking the operation of the transistor 3.

When resuming welding operation, the shortcircuit state between the welding output terminals 6-1 and 6-2 is released by separating the welding rod from the base metal, for example. This causes the operation of the photocoupler 134 to be discontinued, and a pulse is generated in the differentiating circuit consisting of the capacitor 144 and the resistor 149 at the leading edge from the L level to the H level from the inverter 138, causing the flip-flop circuit 133 to be reset. Consequently, the output terminal $\overline{Q}$ outputs an H-level signal, bringing the transistor 3 into an operable state, that is, into a weldable state.

The photocoupler 134 is used to prevent the possible application of a surge voltage exceeding the power source voltage to the inverter 138 or the ICs of the flip-flop circuit 133.

The shortcircuit protection timer circuit 104 is a protective circuit to prevent shortcircuit current from lasting for long hours.

As shortcircuit current flows at the time of ignition of welding arc, the shortcircuit current limiting circuit 103 is actuated to keep the peak level of the shortcircuit current within the maximum allowable current of the transistor 3. The shortcircuit current limiting circuit 103 is not intended to stop welding output. Thus, the shortcircuit current keeps flowing, causing the energy destructing the transistor 3 to be accumulated with time. Thus, the shortcircuit protection timer circuit 104 is actuated to protect the transistor 3 from thermal damage.

Shortcircuiting may occur not only at the time of arc ignition but also in an accidental bridging over the welding terminals with an electrically conductive substance. The shortcircuit protection timer circuit 104 effectively works to cope with the long-hour continuation of shortcircuit current during non-arc ignition period as well as during arc ignition period.

Turning back again to FIG. 4, when the commercial a-c power source 9 or the a-c voltage generated by the engine-driven welder 20 is connected to the power source 1, and the charging switch 44 connected between the battery 11 and the charge control circuit 106 is turned on, the charge control circuit 106 starts charging the battery 11 in the power source 1. When the battery voltage is below a predetermined voltage level, the charge control circuit 106 carries out battery charging in the normal charging mode, whereas the circuit 106 carries out trickle charging for a predetermined hour after the battery voltage rose above a predetermined voltage level.

Figure 13:
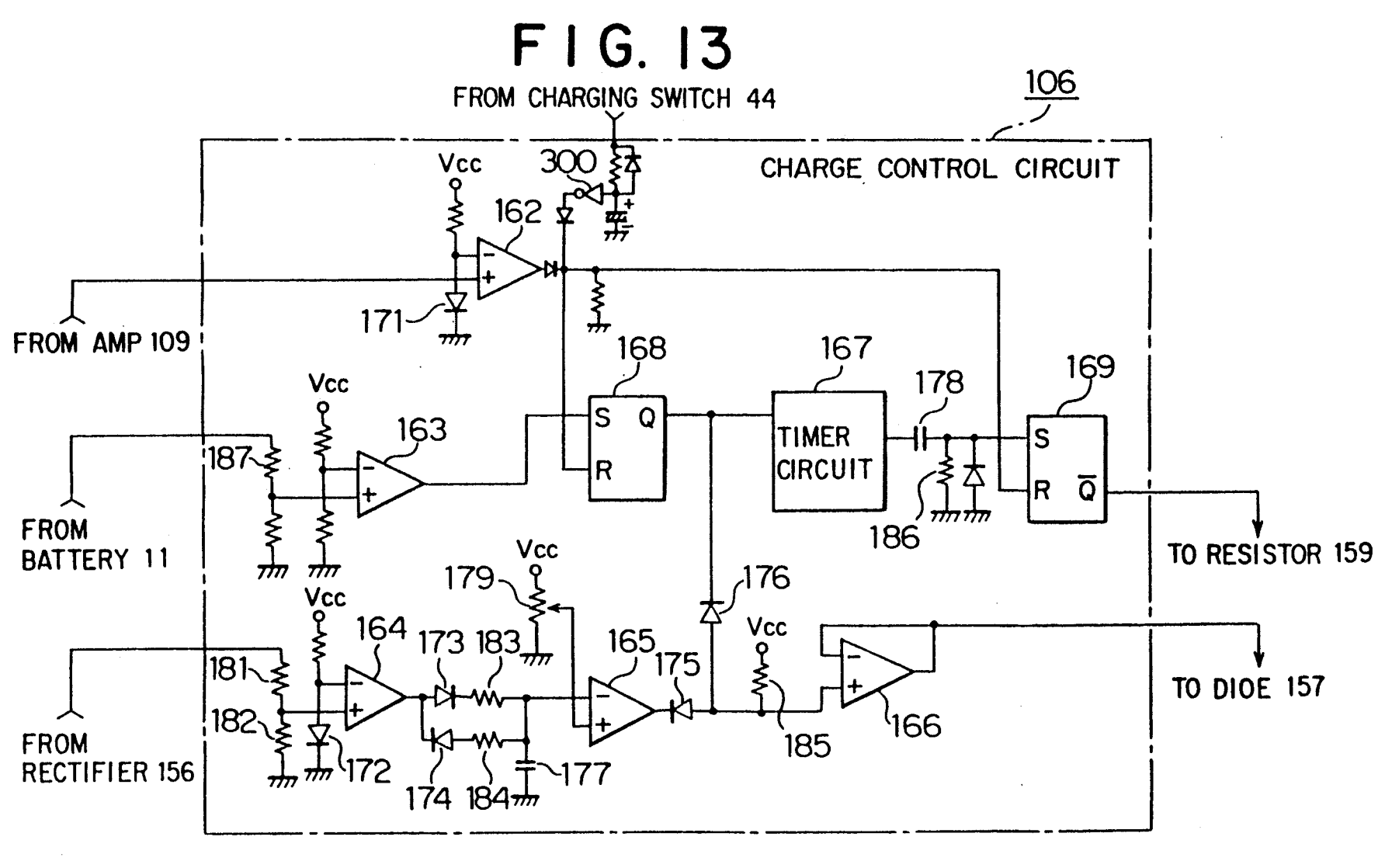

Furthermore, as long as welding current flows in the shunt resistor 4, the charge control circuit 106 detects the welding current via the noise eliminator/amplifier section 101 and the current approximation circuit 102 to carry out charging in the normal charging mode. The circuit configuration of the charge control circuit 106 is shown in FIG. 13, which will be described later.

Figure 12:
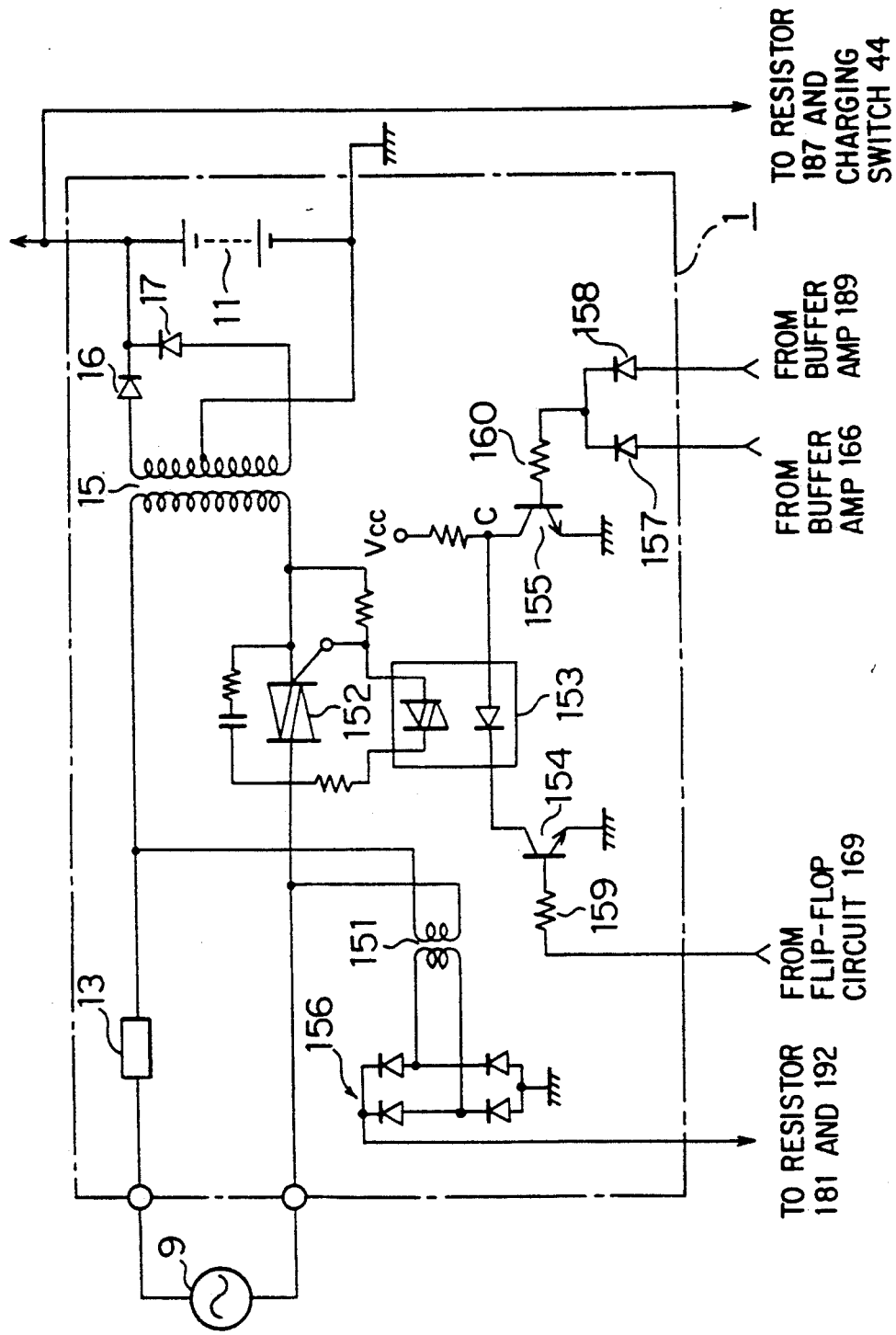
FIG. 12 is a diagram illustrating the construction of an example of the power source.

FIG. 12 shows the circuit configuration of an example of the power source.

Figure 20:
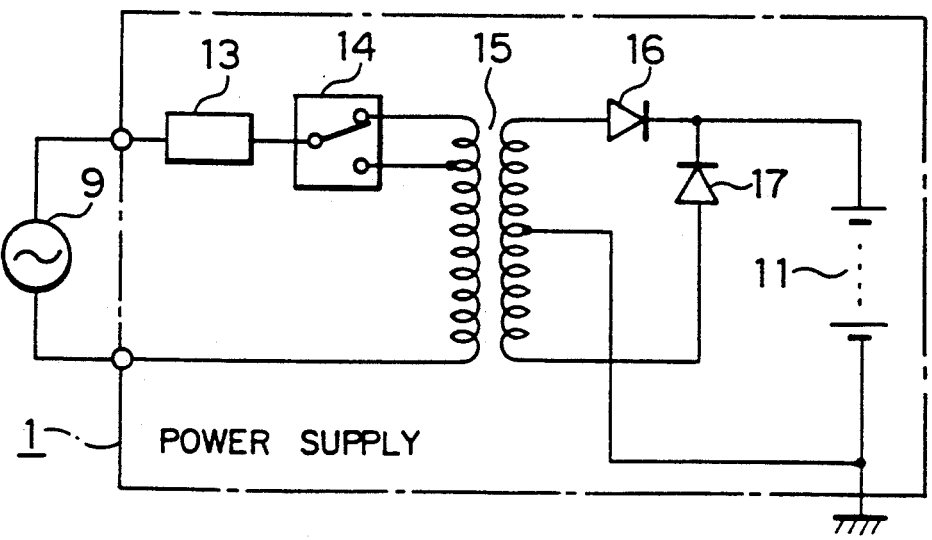
FIG. 20 is a diagram illustrating the construction of the conventional power source.
Figure 21:
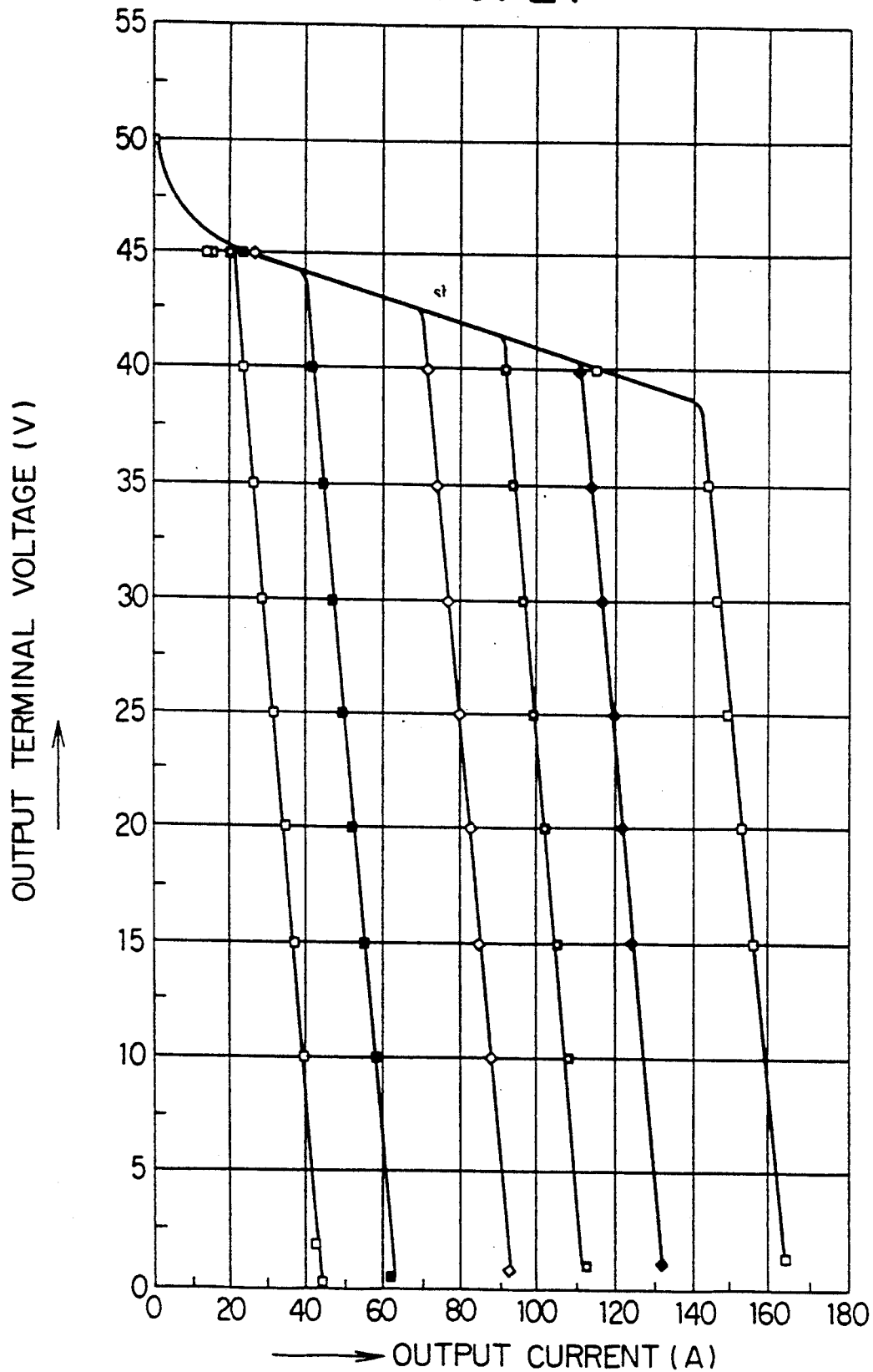
FIG. 21 is a characteristic diagram of the welding output of the conventional battery-driven welder.

In the figure, reference numerals 1 and 11 correspond to like numerals in FIG. 4, numerals 9, 13, 15 through 17 correspond to like numerals in FIG. 20.

Numeral 151 refers to a detecting transformer; 152 to a triac; 153 to a photocoupler; 154 and 155 to transistors; 156 to a rectifier; 157 and 158 to diodes; and 159 and 160 to resistors, respectively.

During welding operation, control is effected so that the transistor 155 is turned off, the transistor 154 is turned on, and the triac 152 is kept in the ON state at all times via the photocoupler 153 to allow the a-c voltage generated in the secondary side of the transformer 15 to be rectified by the diodes 16 and 17 to charge the battery 11.

Trickle charging, which is performed when the battery voltage rises above a predetermined voltage level, is carried out by turning on and off the transistor 155 on the basis of the voltage synchronized with the commercial a-c power source 9 using the rectifier 156 to control the switching of the triac 152 via the photocoupler 153.

FIG. 13 shows the circuit configuration of an example of the charge control circuit.

Numerals 162 through 165 refer to converters; 166 to a buffer amplifier; 167 to a timer circuit; 168 and 169 to flip-flop circuit; 171 through 176 to diodes; 177 and 178 to capacitors; 179 to a variable resistor; and 181 through 186 to resistors, respectively.

During welding, a pulse having a peak value proportional to the magnitude of the welding current is generated by the amplifier 109 shown in FIG. 5, and the pulse is input to the comparator 162, as described above. Since the magnitude of the welding current pulse input to the comparator 162 is much larger than the magnitude of the forward drop voltage of the reference voltage diode 171, an H-level signal is output by the comparator 162. This pulse resets the flip-flop circuits 168 and 169, and thus an L-level signal is output to the output Q of the flip-flop circuit 168, and the H-level signal to the output $\bar{Q}$ of the flip-flop circuit 169.

The L-level signal output by the flip-flop circuit 168 is input to the AND circuit consisting of the diodes 175 and 176, and the resistor 185 to block the passage of the control pulse for trickle charging generated by the comparator 165 and output the L-level voltage from the buffer amplifier 166. The L-level voltage of the buffer amplifier 166 turns off the transistor 155 via the diode 157 and the resistor 160.

The H-level signal output by the flip-flop circuit 169 turns on the transistor 154 via the resistor 159.

Consequently, the triac 152 is controlled to be kept in the ON state at all times, and as a result, the battery is charged in the normal charging mode, as described with reference to FIG. 12.

Figure 14:
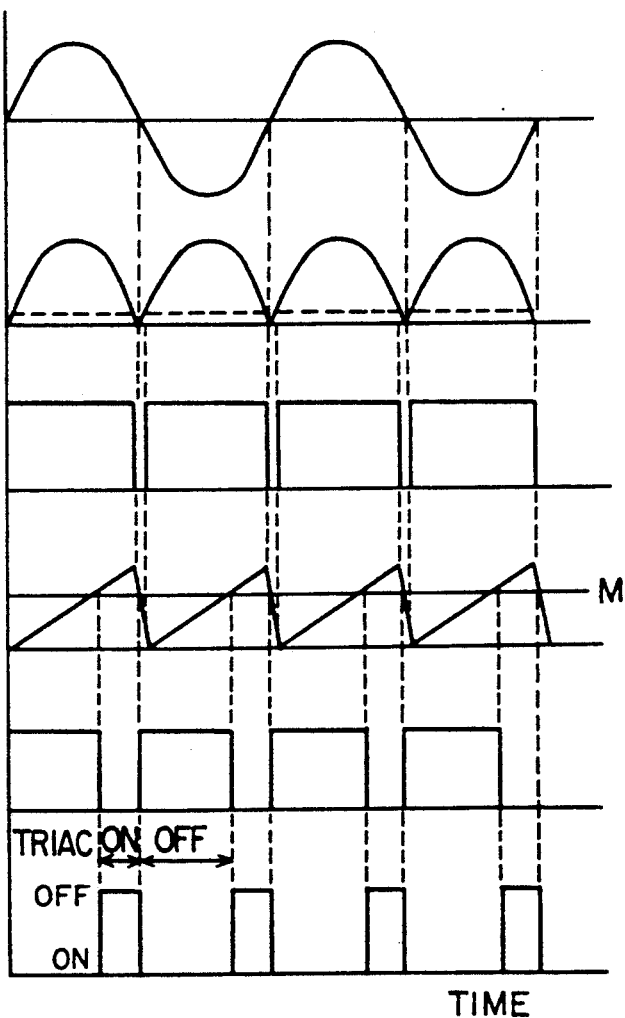
FIG. 14 is a diagram of assistance in explaining the waveforms of control pulses for trickle charge.

The d-c voltage obtained by stepping down the voltage of the commercial a-c power source 9 in the transformer 151, and full-wave rectifying the stepped-down voltage in the rectifier 156 is further divided with the resistors 181 and 182 in the charge control circuit 106, and input to the comparator 164 to compare with the forward drop voltage of the diode 172. A square wave synchronized with the source voltage waveform of the commercial power source 9, as shown in FIG. 14, is obtained from the comparator 164. Since the comparator 164 and the diodes 173 and 174, the resistors 183 and 184, and the capacitor 177 comprise a sawtooth wave generating circuit, a sawtooth wave synchronized with the above-mentioned source voltage waveform is input to the next-stage comparator 165 to compare with the reference voltage M set the variable resistor 179. Thus, a control pulse for trickle charging as show in FIG. 14 is generated from the comparator 165.

As will be described later, when the battery 11 has been charged to a level above a predetermined voltage, the diode 176 is reverse-biased, and the aforementioned control pulse for trickle charging is applied from the charge control circuit 106 to the transistor 155 in the power source 1. As a result, the pulse shown in FIG. 14 is generated at point C of the collector of the transistor 155.

Next, trickling charging will be described, referring to the time chart of FIG. 15.

When the voltage of the battery 11 rises above a predetermined voltage during normal charging, the comparator 163 monitoring the battery voltage sets the flip-flop circuit 168 to actuate the timer circuit 167 and apply the H-level signal to the cathode of the diode 176.

Since the H-level signal is applied to the cathode of the diode 176, the control pulse for trickle charging generated by the comparator 165, as described above, passes through an AND circuit consisting of the diodes 175 and 176, and the resistor 185, and output from the charge control circuit 106 via the buffer amplifier 166. The control pulse then controls the transistor 155 via the diode 157 and the resistor 160 in the power source 1.

Figure 15:
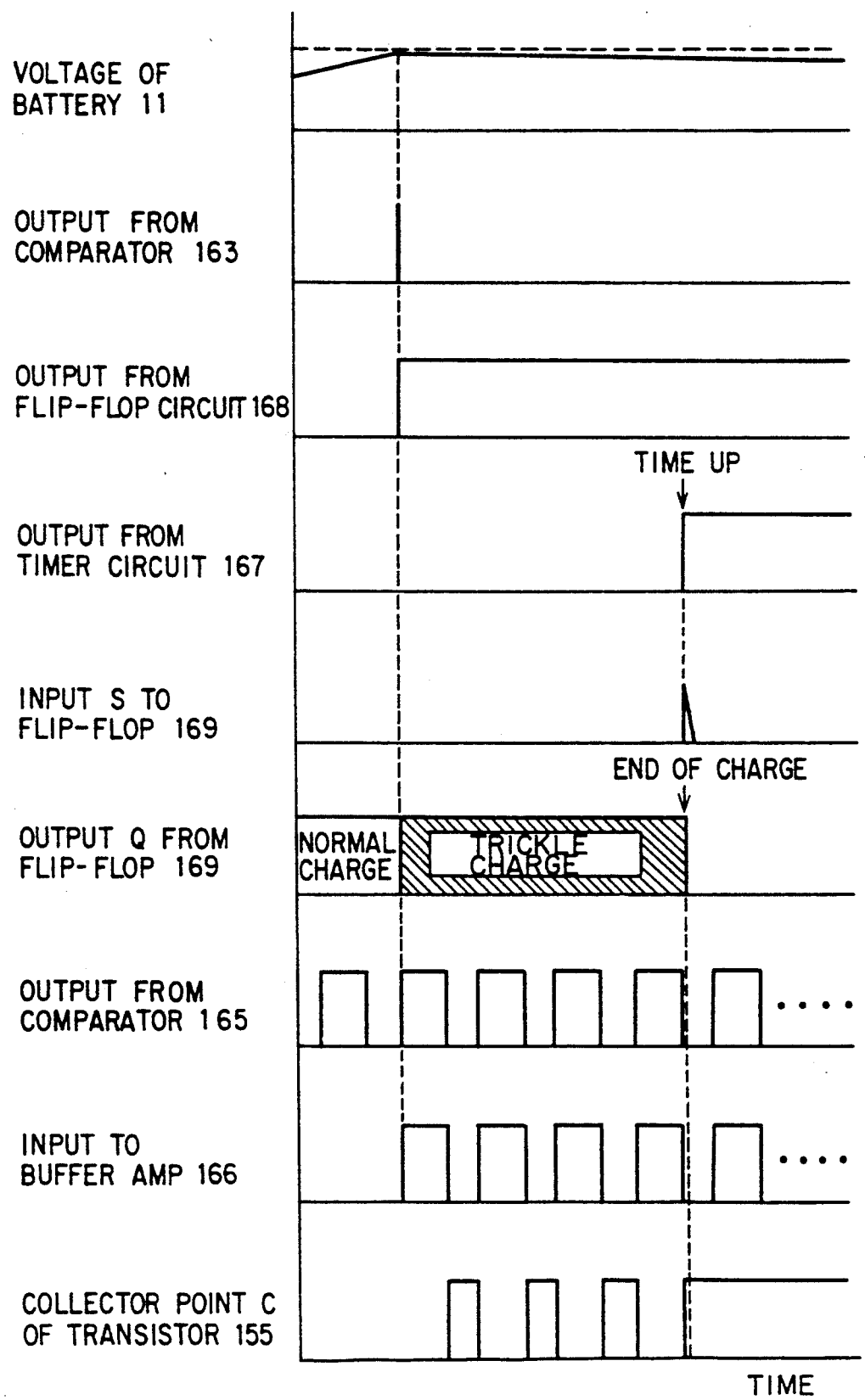
FIG. 15 is a time chart of trickle charge.

Consequently, the pulse shown in FIG. 15 is generated at point C of the collector of the transistor 155 to switch the triac 152 via the photocoupler 153. That is, the phase control of the commercial power source 9 is performed.

This causes the voltage generated in the secondary of the transformer 15 to be dropped, and the current charging the battery 11 to be reduced, bringing battery charging into the trickle charging mode. The trickle charging current is set arbitrarily by the variable resistor 179.

With the lapse of a predetermined time after the start of trickle charging, an H-level signal is output by the time circuit 167. This H-level signal sets the flip-flop circuit 169 via the differentiating circuit consisting of the capacitor 178 and the resistor 186, reversing the output $\overline{Q}$ thereof from the H level to the L level. With this, the transistor 154 in the power source 1 is turned off to block the operation of the photocoupler 153, causing the switching operation of the triac 152 to be stopped. That is, the trickle charging of the battery 11 is terminated.

As welding is resumed during or upon completion of trickle charging, the flip-flop circuits 168 and 169 are reset to resume normal battery charging, and then trickle charging, as described above.

To charge the battery 11 in the state where the commercial a-c power source 9 or the a-c voltage generated by the engine-driven welder has been connected, the charging switch 44 is turned on. By turning on the charging switch 44, the H-level voltage is input to the comparator 162 via the resistor 180 and the diode 170. Thereafter, the same operations as those performed during welding are carried out. That is, normal charging is performed when the battery voltage is below a predetermined voltage, and trickle charging is performed for a predetermined time after the battery voltage rises above a predetermined voltage.

Figure 16:
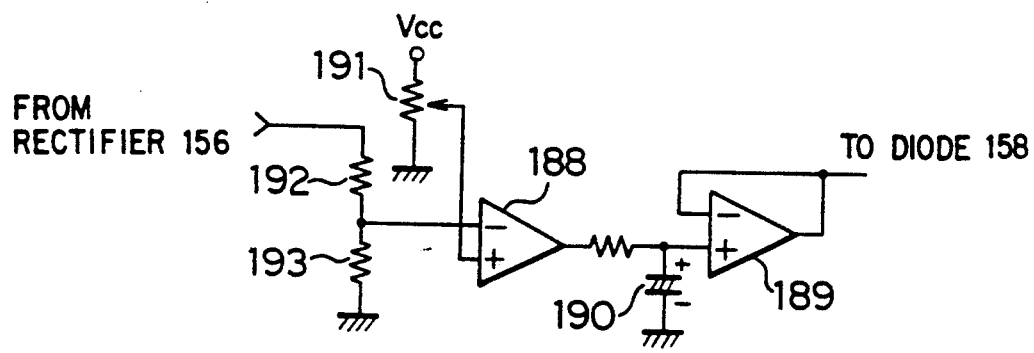
FIG. 16 is a diagram illustrating the construction of an example of the overvoltage input prevention circuit.

FIG. 16 shows the circuit configuration of an example of the overvoltage input preventing circuit.

In the figure, numeral 188 refers to a comparator; 189 to a buffer amplifier; 190 to a capacitor; 191 to a variable resistor; and 192 and 193 to resistors, respectively.

When a high voltage is applied to the commercial a-c power source 9 in the power source 1, or a 200-V a-c power is inadvertently connected to a rated 100-V a-c power source as used in Japan, for example, the 200-V high voltage is rectified by the rectifier 156 via the transformer 15, divided by the resistors 192 and 193, and the divided voltage is input to the comparator 188, which compares the input voltage with the reference voltage of the voltage to be cut set by the variable resistor 191. Then, an H-level signal is output by the comparator 188.

This H-level signal charges the capacitor 190, and is input to the power source 1 via the buffer amplifier 189 to turn on the transistor 155 via the diode 158 and the resistor 160. Consequently, the photocoupler 153 is turned off, and the operation of the triac 152 is blocked. That is, the high voltage is cut off by the triac 152 after a high voltage is applied to the commercial a-c power source 9.

The winding specifications of the transformer 151 and the rectifier 156 are designed to have enough allowance for over-voltage.

Turning back again to FIG. 4, a pulse with a peak value proprotional to the magnitude of welding current is generated in the shut resistor 4 in accordance with the switching of the transistor 3, as described above. Using this pulse, the noise eliminator/amplifier section 101 and the fan driving circuit 108 control the fan 43 in the following manner.

(1) Even when the main switch (not shown in FIG. 4) is thrown, the fan 43 does not start rotation until welding is started.

(2) With the lapse of a predetermined time after the completion of welding, the fan is automatically stopped.

Figure 17:
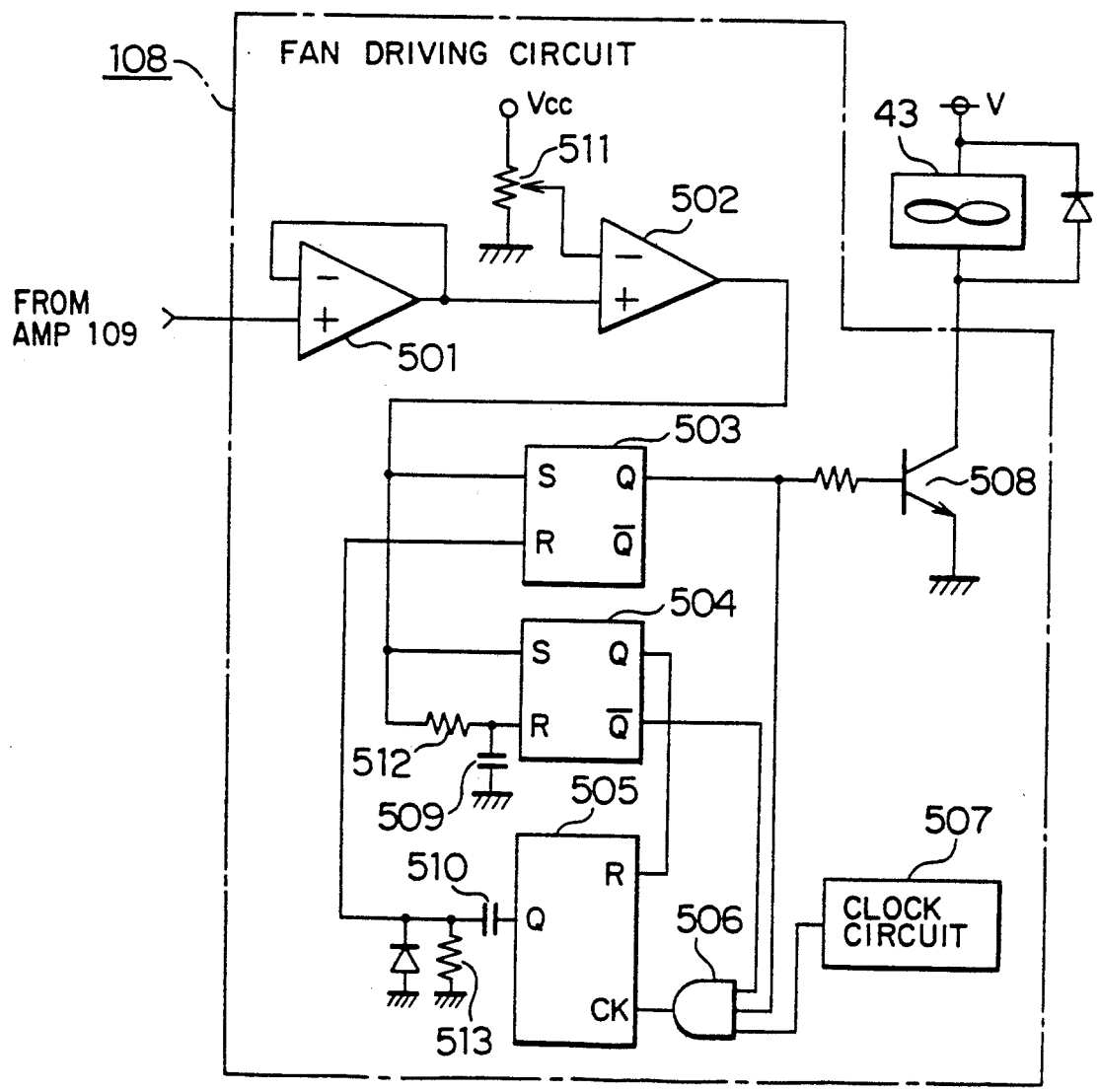
FIG. 17 is a diagram illustrating the construction of the fan driving circuit.

FIG. 17 shows the circuit configuration of an example of the fan driving circuit.

In the figure, reference numerals 43 and 108 correspond to like numerals in FIG. 4. Numeral 501 refers to a buffer amplifier; 502 to a comparator; 503 and 504 to flip-flop circuits; 505 to a counter, 506 to an AND circuit; 507 to a clock circuit; 508 a transistor; 509 and 510 to capacitors; 511 to a variable resistor; and 512 and 513 to resistors, respectively.

Figure 18:
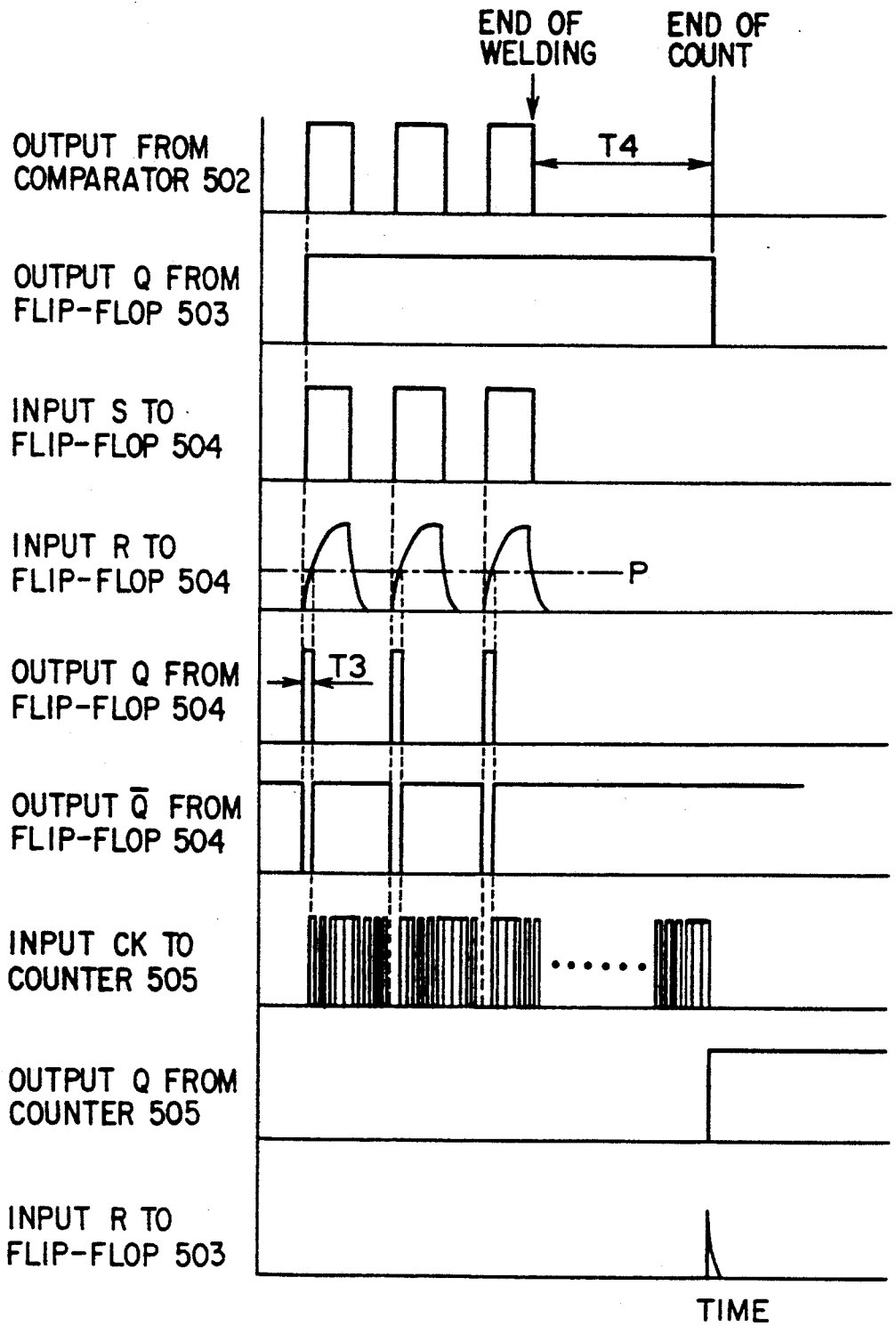
FIG. 18 is a time chart of the fan driving circuit.

The operation of FIG. 17 will be described in the following, referring to the time chart of FIG. 18.

As has already been described, a pulse with a peak value proportional to the magnitude of welding current is generated in the shunt resistor 4 in accordance with the switching of the transistor 3. This welding current pulse is input to the buffer amplifier 501 of the fan driving circuit 108.

The welding current pulse input to the fan driving circuit 108 is input to the comparator 502 via the buffer amplifier 501, which compares the pulse with the reference voltage of the rotation start voltage of the fan 43 set by the variable resistor 511.

When the welding current flowing in the shunt resistor 4 is above the rotation start current of the fan 43, the output of the comparator 502 sets the flip-flop circuits 503 and 504. As the flip-flop circuit 503 is set, the output terminal Q thereof is set to the H level, and the transistor 508 is controlled to the ON state, causing the fan 43 to start rotation. That is, even when the main switch (not shown) in thrown, the fan 43 does not start. The fan 43 starts rotation only when welding is started and the welding current is above a predetermined value.

When the flip-flop circuit 504 is set, the capacitor 509 is charged via the resistor 512. As the charge voltage reaches level P shown in FIG. 18, the flip-flop circuit 504 is reset. In other words, time T3 after set by the output of the comparator 502, the flip-flop circuit 504 is reset. Consequently, the flip-flop circuit 504 repeats setting and resetting as long as the welding current of a level above the rotation start current of the fan 43 set by the variable resistor 511 is kept flowing in the shunt resistor 4. As a result, the counter 505 counts the clock from the clock circuit 507 via the AND circuit 506 as long as the output terminal $\overline{Q}$ of the flip-flop circuit 504 is at the H level.

The counter is, however, reset when the output terminal Q of the flip-flop circuit 504 is set to the H level. So, no count-up signal is output by the counter 505.

When welding is not resumed within time T4 (T3<<T4) from the time welding has been ended, a count-up signal is output from the counter 505. As the H level of the count-up signal is given from the counter 505, the flip-flop circuit 503 is reset via the differentiating circuit consisting of the capacitor 510 and the resistor 513. With this, the transistor 508 is turned off, causing the fan 43 to stop. Since the fan 43 keeps running for time T4 after the completion of welding, the transistor for controlling the welding current can be cooled sufficiently.

When welding is resumed within time T4 after the completion of welding, the flip-flop circuit 504 is set by the output from the comparator 502. Thus, the counter 505 is reset before the above-mentioned count-up signal is output by the counter 505. As a result, the fan 43 keeps running.

As is evident from the above description, welding current can be obtained in the battery-driven welder in which the shunt resistor is connected between the switching element and the earth. This eliminates the need for providing a floating power source separated from the earth, leading to simplified circuit configuration and reduced cost.

Furthermore, the use of protective circuits protects switching elements and makes it possible to prevent accidents, resulting in improved reliability.

Since the charging device is free from mechanical contacts such as relays, reliability is substantially improved. During trickle charging, the optimum current value for the battery can be set by the variable resistor. The absence of intermediate taps on the primary of the transformer makes the charging device inexpensive.

Since overvoltage is cut off very quickly by electronic circuits, the burden on each component can be reduced. The cut voltage can be easily set by the variable resistor.

Since the rotation of the fan is controlled on the basis of the welding current flowing in the shunt resistor connected between the switching element and the earth, the fan never starts rotation even if the main switch is turned on until welding operation is started. If the main switch is inadvertently left in the ON state after the completion of welding, the fan is automatically stopped after the lapse of a predetermined time. This prevents the battery from being exhausted, leading to economical fan control.

What is claimed is:

1. A welding apparatus comprising:
    an engine welder including an alternator means for generating an a-c voltage, said engine welder also including a means for converting said a-c voltage into d-c voltage;
    a battery welder including a battery;
    changeover means for connecting said engine welder and said battery welder in parallel, said change over means also separately connecting said engine welder to engine welding outputs and said battery welder to battery welding outputs;
    switching means for blocking and passing current between a negative terminal of said battery welding outputs and a ground terminal of said battery;
    a shunt resistor connected between said switching means and said ground terminal of said battery;
    current approximation means for detecting current flowing in said shunt resistor and for generating a welding current waveform substantially representative of a current flowing through said battery welding terminals; and
    controller means for controlling said switching element dependent on said welding current waveform.

2. A welding apparatus as set forth in claim 1 wherein said battery welder has a charging means for charging said battery.

3. A welding apparatus as set forth in claim 2 wherein said charging means uses charging power supplied by an external commercial a-c power source.

4. A welding apparatus as set forth in claim 2 wherein said alternator means of said engine welder has a single-phase a-c winding for generating a-c voltage equivalent to said commercial a-c power source to supply charging power to said charging means from said engine welder.

5. A welding apparatus as set forth in claim 2 wherein said charging means has a charging current control means for starting battery charging by one of a start of welding or a throwing of a charging switch, said charging current control means performs normal battery charging when a battery voltage is below a predetermined voltage, and performs trickle charging for a predetermined period after said battery voltage rises above another predetermined voltage.

6. A welding apparatus as set forth in claim 2 wherein said charging means has an overvoltage input protection means for disconnecting an a-c overvoltage immediately when said a-c overvoltage is applied to said charging device.

7. A welding apparatus as set forth in claim 1 further comprising a fan driving means for driving a fan when current higher than a predetermined current value flows in said shunt resistor, and turning off said fan when said current does not flow continuously for more than a predetermined time.

8. A welding apparatus in accordance with claim 1, wherein:
    said current approximation means detects said current when said switching element is turned on and said welding current waveform is generated on a basis of said current detected in said shunt resistor; and
    a reactor is connected in series with said battery and said battery welding outputs.

9. A welding apparatus in accordance with claim 1, further comprising:
    protective means for detecting abnormal current flowing in said shunt resistor and for blocking operation of said switching means.

10. A welding apparatus in accordance with claim 9, wherein:
    said protective means includes a shortcircuit current limiting means for blocking said operation of said switching element when a peak value of said current flowing in said shunt resistor exceeds a predetermined value.

11. A welding apparatus in accordance with claim 9, wherein:
    said protective means includes a shortcircuit protective timer means for blocking said operation of said switching element when a peak value of said current flowing in said shunt resistor exceeds a predetermined value and exists for more than a predetermined time.

12. A welding apparatus comprising:
    a battery welder including a battery and battery welding outputs;
    switching means for blocking and passing current between a first terminal of said battery welding outputs and a first terminal of said battery;
    a shunt resistor connected between said switching means and said first terminal of said battery;

current approximation means for detecting current flowing in said shunt resistor and for generating a welding current waveform substantially representative of a current flowing through said battery welding terminals;

controller means for controlling said switching element dependent on said welding current waveform;

a shortcircuit current limiting means for blocking operation of said switching element when a peak value of said current flowing in said shunt resistor exceeds a predetermined value; and a shortcircuit protective timer means for blocking said operation of said switching element when a peak value of said current flowing in said shunt resistor exceeds a predetermined value and exists for more than a predetermined time.

* * * * *